US012012023B2

(12) United States Patent
Hirasawa

(10) Patent No.: US 12,012,023 B2
(45) Date of Patent: Jun. 18, 2024

(54) VEHICLE SEAT STRUCTURE, PAD MEMBER MOLDING METHOD, AND VEHICLE SEAT FABRICATION METHOD

(71) Applicant: NHK SPRING CO., LTD., Yokohama (JP)

(72) Inventor: Toshiki Hirasawa, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/658,980

(22) Filed: Apr. 12, 2022

(65) Prior Publication Data

US 2022/0332234 A1 Oct. 20, 2022

(30) Foreign Application Priority Data

Apr. 19, 2021 (JP) .................................. 2021-070380

(51) Int. Cl.
| | | |
|---|---|---|
| *B60N 2/58* | (2006.01) | |
| *A47C 31/02* | (2006.01) | |
| *B60N 2/68* | (2006.01) | |
| *B60N 2/70* | (2006.01) | |
| *B68G 7/05* | (2006.01) | |

(52) U.S. Cl.
CPC ............ *B60N 2/7017* (2013.01); *A47C 31/02* (2013.01); *B60N 2/5816* (2013.01); *B60N 2/5883* (2013.01); *B60N 2/68* (2013.01); *B68G 7/05* (2013.01)

(58) Field of Classification Search
CPC ...... B60N 2/5883; B60N 2/686; B60N 2/643; B60N 2/5816; B50N 2/5816; A47C 31/023; A47C 31/026; A47C 13/005; A47C 4/028; A47C 4/06
See application file for complete search history.

(56) References Cited

U.S. PATENT DOCUMENTS

| 6,152,534 | A | * | 11/2000 | Maeda | ..................... | B60N 2/70 |
| | | | | | | 297/452.59 |
| 6,953,221 | B1 | * | 10/2005 | Tseng | ....................... | A47C 4/10 |
| | | | | | | 297/23 |
| 7,607,733 | B1 | * | 10/2009 | Lin | ........................ | A47C 1/124 |
| | | | | | | 297/440.2 |
| 9,902,304 | B2 | * | 2/2018 | Kijima | ..................... | B60N 2/68 |
| 2005/0017554 | A1 | * | 1/2005 | Mizelle | .................... | A47C 4/24 |
| | | | | | | 297/218.3 |

(Continued)

FOREIGN PATENT DOCUMENTS

| CN | 105083083 | A | * | 11/2015 | ............. | B60N 2/449 |
| CN | 115230548 | A | * | 10/2022 | ........... | B60N 2/5883 |

(Continued)

*Primary Examiner* — Timothy J Brindley
(74) *Attorney, Agent, or Firm* — Knobbe, Martens, Olson & Bear, LLP

(57) ABSTRACT

A vehicle seat structure, including: a frame member that forms a framework of the vehicle seat; a pad member that is formed of a foam material and is disposed at a front face side of the frame member; and a first rear face member that is integrated with the pad member at a rear face side of the pad member, the first rear face member including: a main body portion that is fixed to the pad member, and an extension portion that extends from the pad member and is fixed to the frame member.

9 Claims, 13 Drawing Sheets

(56) References Cited

U.S. PATENT DOCUMENTS

| | | | | |
|---|---|---|---|---|
| 2006/0113756 A1* | 6/2006 | Tracht | ................... | B60N 2/5883 |
| | | | | 280/730.1 |
| 2013/0249269 A1* | 9/2013 | Sasaki | .................. | B60N 2/5825 |
| | | | | 297/452.18 |
| 2019/0176665 A1* | 6/2019 | Inoue | ...................... | B60N 2/682 |
| 2019/0176740 A1* | 6/2019 | Hioda | .................. | B60N 2/2222 |
| 2021/0052077 A1* | 2/2021 | Smith | ....................... | A47C 4/06 |

FOREIGN PATENT DOCUMENTS

| | | | | | |
|---|---|---|---|---|---|
| FR | 2686553 | A1 | * | 7/1993 | ........... B60N 2/5883 |
| FR | 2870803 | A1 | * | 12/2005 | ........... B60N 2/5883 |
| FR | 2891217 | A1 | * | 3/2007 | ............... B60N 2/58 |
| JP | 2573991 | Y2 | | 6/1998 | |
| JP | 2010137593 | A | * | 6/2010 | ........... B60N 2/0232 |
| WO | WO-2010038699 | A1 | * | 4/2010 | ........... B60N 2/4228 |
| WO | WO-2020105329 | A1 | * | 5/2020 | ........... A47C 31/023 |
| WO | WO-2021117856 | A1 | * | 6/2021 | ............... B60N 2/64 |

\* cited by examiner

VEHICLE SEAT STRUCTURE, PAD MEMBER MOLDING METHOD, AND VEHICLE SEAT FABRICATION METHOD

CROSS-REFERENCE TO RELATED APPLICATION

This application is based on and claims priority under 35 USC 119 from Japanese Patent Application No. 2021-070380 filed on Apr. 19, 2021, the disclosure of which is incorporated by reference herein.

BACKGROUND

Technical Field

The present invention relates to a vehicle seat structure, a pad member molding method, and a vehicle seat fabrication method.

Related Art

Japanese Utility Model Application Registration No. 2,573,991 discloses a rear seat of a hatchback-type automobile at which a carpet extends from a luggage compartment to a rear face of a seat back and the seat back tilts forward over a seat cushion. At the seat back of the rear seat recited in Japanese Utility Model Application Registration No. 2,573,991, warping of a terminal end of the carpet is prevented by an end wrap being provided at a terminal end of a cover skin. The end wrap is superposed on a distal end edge of the carpet at a rear face of the seat hack and is fastened to the carpet at a frame member side thereof.

In the seat back recited in Japanese Utility Model Application Registration No. 2,573,991, a pad member is not fixed directly to the frame member at the rear face side of the pad member but the cover skin is fixed directly to the frame member. Therefore, when an external force is applied to the seat back, such as a vehicle occupant trying to move the seat back or touching the seat back in order to fetch an object from behind the seat back, the pad member may be moved from a predetermined position at the frame member. When the pad member moves from the predetermined position at the frame member, the pad member is absent from below the cover skin and a vehicle occupant may feel the frame member through the cover skin, which may cause discomfort to the vehicle occupant.

SUMMARY

The present disclosure provides a vehicle seat structure, a pad member molding method and a vehicle seat fabrication method in which a pad member may be assuredly fixed to a frame member.

A vehicle seat structure according to a first aspect of the present disclosure includes: a frame member that forms a framework of the vehicle seat; a pad member that is formed of a foam material and is disposed at a front face side of the frame member; and a first rear face member that is integrated with the pad member at a rear face side of the pad member, the first rear face member including: a main body portion that is fixed to the pad member, and an extension portion that extends from the pad member and is fixed to the frame member.

In the vehicle seat structure according to the first aspect of the present disclosure, the first rear face member is a rear face member that is integrated with the pad member at the rear face side of the pad member. The first rear face member includes the main body portion, which is fixed to the pad member, and the extension portion, which extends from the pad member and is fixed to the frame member. Therefore, the pad member may be assuredly fixed to the frame member via the first rear face member.

In a vehicle seat structure according to a second aspect of the present disclosure, in the vehicle seat structure according to the first aspect, the main body portion and the extension portion are structured by separate members.

According to the vehicle seat structure according to the second aspect of the present disclosure, the extension portion that is fixed to the frame member and the main body portion that is fixed to the pad member are structured as separate members. Therefore, freedom of selection of a material to be used for the extension portion may be increased. Thus, an optimum material for fixing to the frame member may be selected for the extension portion, and the pad member may be more assuredly fixed at the frame member via the extension portion. For example, if the extension portion and frame member are fixed by a clip being inserted through clip holes penetrating through the extension portion and the frame member, position management of the clip holes may be administered at the extension portion alone. Therefore, position management of the clip holes may be easier than in a structure in which the main body portion and the extension portion are integrally structured.

In a vehicle seat structure according to a third aspect of the present disclosure, the vehicle seat structure according to the first aspect or the second aspect further includes: a cover skin that covers the pad member in a state in which the frame member, the first rear face member and the pad member are accommodated inside the cover skin, the cover skin including: a first cover skin that covers a side at which a front face of the pad member is disposed, and a second cover skin that covers a side at which the first rear face member integrated with the pad member is disposed; a stitched portion at which the first cover skin and the second cover skin are stitched together; and a second rear face member that is disposed between the extension portion and the second cover skin, one end of the second rear face member being fixed to the frame member together with the extension portion, and another end of the second rear face member being stitched at the stitched portion.

In the vehicle seat structure according to the third aspect of the present disclosure, the second rear face member is provided between the extension portion and the second cover skin, the one end of the second rear face member is fixed to the frame member together with the extension portion, and the another end of the second rear face member is stitched together with the stitched portion at which the first cover skin and second cover skin are stitched. Therefore, the first cover skin and second cover skin are fixed at the frame member by the second rear face member. Thus, because the front face side of the pad member is covered by the first cover skin that is fixed at the frame member, the pad member is fixed at the frame member by the first cover skin. Accordingly, the pad member is fixed at the frame member by the first rear face member and by the second rear face member and the first cover skin, and mispositioning of the pad member may be doubly prevented.

In the vehicle seat structure according to the third aspect of the present disclosure, the another end of the second rear face member is stitched together with the stitched portion. If the second rear face member is stitched to the inner side of the second cover skin, sinking of the stitched portion of the second cover skin to the inner side may be suppressed by the second rear face member, and external appearance may be excellently finished. If the second rear face member is stitched to the inner side of the first cover skin, the stitched portion may be inclined to the side thereof at which the frame member is disposed to enable assembly of the second cover skin. Moreover, sinking of the stitched portion of the first cover skin to the inner side may be suppressed by the second rear face member, and the external appearance may be excellently finished.

In a vehicle seat structure according to a fourth aspect of the present disclosure, in the vehicle seat structure according to any one of the first to third aspects, the first rear face member includes a folded portion between the main body portion and the extension portion, the rear face member being arranged in two layers at the folded portion.

According to the vehicle seat structure according to the fourth aspect of the present disclosure, because the rear face member includes the folded portion that is doubled up between the main body portion and the extension portion, position management of a fixing position when the extension portion is being fixed to the frame member may be easier than in a structure without the folded portion.

In a vehicle seat structure according to a fifth aspect of the present disclosure, in the vehicle seat structure according to the fourth aspect, an end portion of the folded portion is disposed at a position set apart from a corner portion of a back face side of the pad member.

According to the vehicle seat structure according to the fifth aspect of the present disclosure, because the end portion of the folded portion is disposed at the position set apart from the corner portion of the back face side of the pad member, the end portion of the folded portion may be disposed to avoid the corner portion, at which loads concentrate.

In a vehicle seat structure according to a sixth aspect of the present disclosure, in the vehicle seat structure according to any one of the first to fifth aspects, the extension portion extends from the pad member, is folded back to the rear face side of the frame member, and is fixed to the frame member.

According to the vehicle seat structure according to the sixth aspect of the present disclosure, because the extension portion extends from the pad member, is folded back to the rear face side of the frame member, and is fixed to the frame member, the frame member is surrounded from the front face side to the rear face side thereof by the first rear face member. Therefore, the pad member may be more securely fixed at the frame member via the first rear face member.

In a vehicle seat structure according to a seventh aspect of the present disclosure, in the vehicle seat structure according to any one of the first to sixth aspects, the frame member and the extension portion include insertion holes at respective corresponding positions, and a fixing member is inserted through the insertion holes.

According to the vehicle seat structure according to the seventh aspect of the present disclosure, because the frame member and the extension portion include the insertion holes through which the fixing member is to be inserted at the respective corresponding positions, the extension portion may be easily fixed to the frame member by the fixing member being inserted through the fixing holes.

A pad member molding method according to an eighth aspect of the present disclosure includes: disposing a principal portion of a rear face member in an upper die, the rear face member including a main body portion to be integrated with the pad member and an extension portion extending from the main body portion, and the principal portion excluding a terminal end portion of the extension portion; in a state in which an impregnation prevention member is fastened to a face of the extension portion, excluding the terminal end portion, at the opposite side thereof from the side at which the upper die is disposed, clamping a lower die to the upper die, the lower die forming a space between the upper die and the lower die; and forming a pad member having an integrated rear face member, in which the main body portion is integrated, the forming including injecting and expanding a resin in the space, the pad member having the integrated rear face member including the extension portion extending from the main body portion.

In the pad member molding method according to the eighth aspect of the present disclosure, of the main body portion that is integrated with the pad member and the rear face member that includes the extension portion extending from the main body portion, the principal portion excluding the terminal end portion of the extension portion is disposed in the upper die. The impregnation prevention member is fixed at the surface of the extension portion excluding the terminal end portion at the opposite side thereof from the side at which the upper die is disposed. In this state, the lower die is fastened to form the space between the upper die and the lower die, the resin is injected into the cavity, and the resin is expanded. Thus, the impregnation prevention member is interposed between the extension portion excluding the terminal end portion and the foam material that is expanded in the space formed between the upper die and the lower die. Therefore, impregnation of the foam material into the extension portion excluding the terminal end portion may be prevented.

In a pad member molding method according to a ninth aspect of the present disclosure, in the pad member molding method according to the eighth aspect, the terminal end portion is bent back along the upper die and is retained at the upper die 1$w$ a retaining member.

According to the pad member molding method according to the ninth aspect of the present disclosure, the terminal end portion of the extension portion is bent back along the upper die and is retained at the upper die by the retaining member. Therefore, because the terminal end portion is retained at the upper die, the rear face member may be retained at the upper die easily.

A vehicle seat fabrication method according to a tenth aspect of the present disclosure includes: molding a pad member having an integrated rear face member, the molding including integrating a main body portion, which is a portion of a first rear face member, with a pad member that is formed of a foam material; disposing the main body portion of the pad member having the integrated rear face member at a front face side of a frame member that forms a framework of the vehicle seat; fixing the pad member having the integrated rear face member to the frame member, the fixing including fixing an extension portion of the first rear face member to the frame member, the extension portion extending from the main body portion; and covering, with a cover skin, the pad member having the integrated rear face member that has been fixed to the frame member.

In the vehicle seat fabrication method according to the tenth aspect of the present disclosure, the main body portion that is a portion of the first rear face member is integrated with the pad member formed of the foam material, molding the pad member having the integrated rear face member. The main body portion of the pad member having the integrated rear face member is disposed at the front face side of the frame member forming the framework of the vehicle seat, and the extension portion of the first rear face member extending from the main body portion is fixed to the frame member. Thus, the extension portion of the first rear face member is fixed to the frame member, and the pad member may be assuredly fixed at the frame member via the first rear face member.

In a vehicle seat fabrication method according to an eleventh aspect of the present disclosure, in the vehicle seat fabrication method according to the tenth aspect, the cover skin includes: a first cover skin that covers a side at which a front face of the pad member having the integrated rear face member is disposed; and a second cover skin that covers a side at which the first rear face member that is integrated with the pad member having the integrated rear face member is disposed, the method further including: disposing a second rear face member between the extension portion and the second cover skin; fixing one end of the second rear face member to the frame member together with the extension portion; and stitching another end of the second rear face member to a stitched portion at which the first cover skin and the second cover skin are stitched together.

In the vehicle seat fabrication method according to the eleventh aspect of the present disclosure, the second rear face member is disposed between the extension portion and the second cover skin, the one end of the second rear face member is fixed to the frame member together with the extension portion, and the another end of the second rear face member is stitched together with the stitched portion at which the first skin cover and second skin cover are stitched. Therefore, the first cover skin and second cover skin are fixed at the frame member by the second rear face member. Thus, because the front face side of the pad member is covered by the first cover skin that is fixed at the frame member, the pad member is fixed at the frame member by the first cover skin. Accordingly, the pad member is fixed at the frame member by the first rear face member and by the second rear face member and the first cover skin, and mispositioning of the pad member may be doubly prevented.

Moreover, in the vehicle seat fabrication method according to the eleventh aspect of the present disclosure, the another end of the second rear face member is stitched together with the stitched portion. If the second rear face member is stitched to the inner side of the second cover skin, sinking of the stitched portion of the second cover skin to the inner side may be suppressed by the second rear face member, and external appearance may be excellently finished. If the second rear face member is stitched to the inner side of the first cover skin, the stitched portion may be inclined to the side thereof at which the frame member is disposed to enable assembly of the second cover skin. Moreover, sinking of the stitched portion of the first cover skin to the inner side may be suppressed by the second rear face member, and the external appearance may be excellently finished.

As described above, according to the vehicle seat structure according to the first aspect, the pad member may be assuredly fixed at the frame member via the first rear face member.

According to the vehicle seat structure according to the second aspect, a degree of freedom of selection of a material to be used for the extension portion may be raised. Thus, an optimum material for fixing to the frame member may be selected for the extension portion, and the pad member may be more assuredly fixed at the frame member via the extension portion. Moreover, position management of clip holes may be easier than in a structure in which the main body portion and the extension portion are integrally structured.

According to the vehicle seat structure according to the third aspect, mispositioning of the pad member may be doubly prevented and the external appearance may be excellently finished.

According to the vehicle seat structure according to the fourth aspect, position management of a fixing position when the extension portion is being fixed to the frame member may be easier than in a structure without the folded portion.

According to the vehicle seat structure according to the fifth aspect, the end portion of the folded portion may be disposed to avoid the corner portion at which loads concentrate.

According to the vehicle seat structure according to the sixth aspect, the pad member may be more securely fixed at the frame member via the first rear face member.

According to the vehicle seat structure according to the seventh aspect, the extension portion may be fixed to the frame member easily.

According to the pad member molding method according to the eighth aspect, impregnation of the foam material into the extension portion excluding the terminal end portion may be prevented.

According to the pad member molding method according to the ninth aspect, the rear face member may be retained at the upper die easily.

According to the vehicle seat fabrication method according to the tenth aspect, because the extension portion of the first rear face member is fixed to the frame member, the pad member may be assuredly fixed at the frame member via the first rear face member.

According to the vehicle seat fabrication method according to the eleventh aspect, mispositioning of the pad member may be doubly prevented and the external appearance may be excellently finished.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
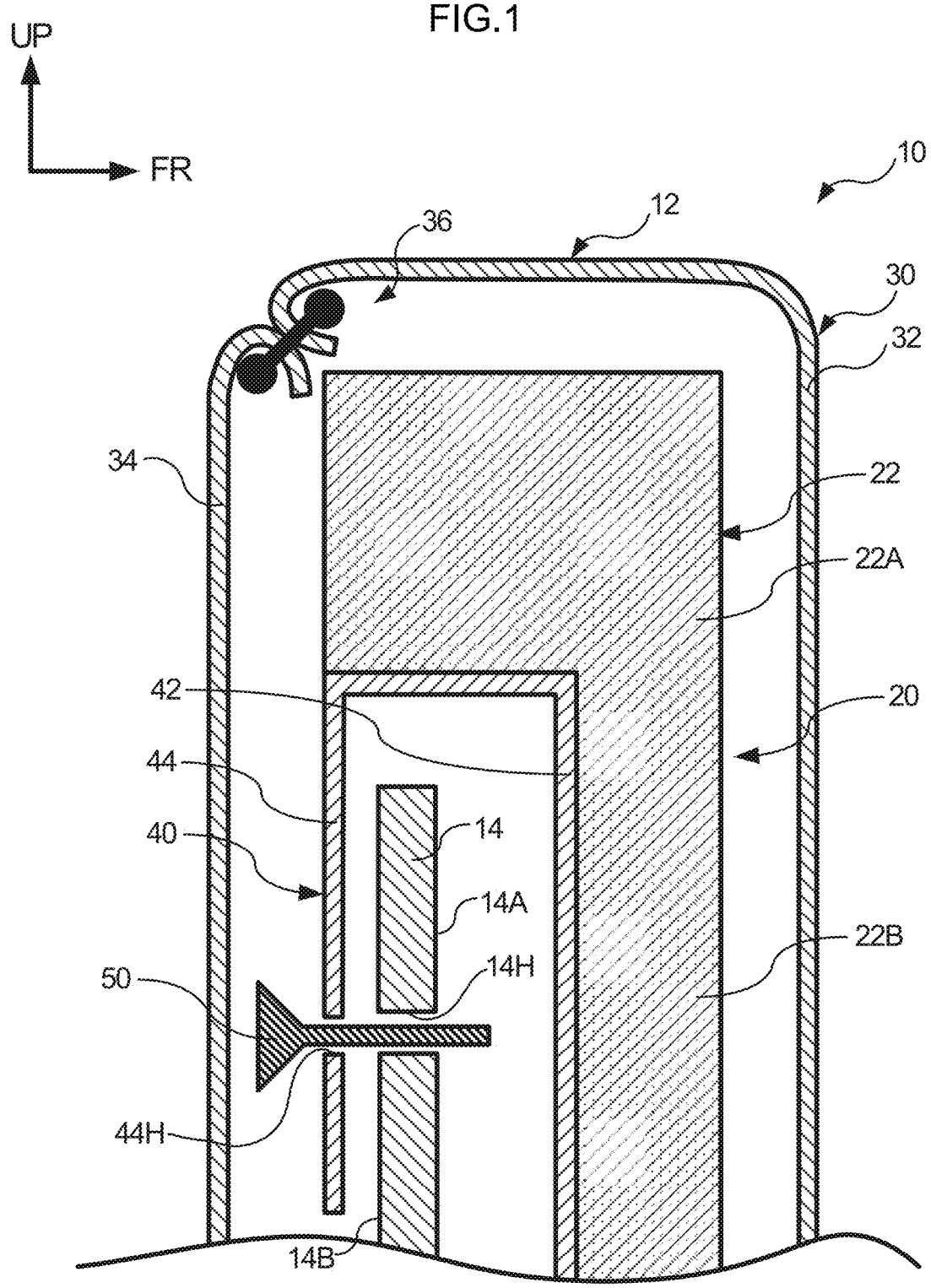
FIG. 1 is a schematic vertical sectional view of principal portions, schematically showing a portion of a seat back at which a vehicle seat structure according to a first exemplary embodiment is employed.

Below, a seat back of a vehicle seat at which a vehicle seat structure according to a first exemplary embodiment is employed is described using FIG. 1 to FIG. 5. In the drawings, gaps are depicted between members but in reality these gaps are absent and the members are fixed in contact. In the descriptions below, descriptions referring to front, rear, upper and lower directions indicate front, rear, upper and lower directions of the vehicle. The arrow FR that is shown where appropriate in the drawings indicates the front direction in the vehicle front-and-rear direction, and the arrow UP indicates the upper direction in the vehicle height direction.

FIG. 1 shows a seat back 12 of a vehicle seat 10 to be disposed in a vehicle. The seat back 12 stands from a rear end portion of a seat cushion (not shown in the drawings) on Which a vehicle occupant sits, and supports the upper body of the vehicle occupant sitting on the seat cushion. FIG. 1 depicts only an upper portion of the seat back 12. A lower portion of the seat back 12 is not shown in the drawings, but the lower portion of the seat back 12 has a similar structure to the upper portion.

—Seat Back Structure—

As shown in FIG. 1, the seat back 12 is equipped with a frame member 14 fabricated of metal that forms a framework of the vehicle seat 10, a pad member having an integrated rear face member 20 that covers the frame member 14, and a trim cover 30 serving as an example of a cover skin that covers a front face and rear face of the pad member having the integrated rear face member 20.

The pad member having the integrated rear face member 20 is provided with a pad member 22 and a first rear face member (a rear face member) 40. The pad member 22 is formed of a foam material such as, for example, urethane (resin) or the like. The first rear face member 40 is formed of, for example, a felt. The pad member 22 and the first rear face member 40 are formed integrally in the pad member having the integrated rear face member 20 by expansion and molding of the resin forming the pad member 22. A molding method of the pad member having the integrated rear face member 20 is described in more detail below. The pad member having the integrated rear face member 20 is arranged such that the pad member 22 is disposed at the side thereof at which a vehicle occupant sits (which may below be referred to as the front face side), that is, the vehicle front direction side, and such that the first rear face member 40 is disposed at the rear face side, that is, the vehicle rear direction side.

The pad member 22 is provided with pad end portions 22A and a pad middle portion 22B. The pad end portions 22A are disposed at both ends of the pad member 22 in the vehicle vertical direction and have substantially rectangular cross sections. The pad middle portion 22B connects the pad end portion 22A at the vehicle upper side with the pad end portion 22A at the vehicle lower side (which is not shown in the drawings) at the vehicle front sides thereof and has a long rectangular cross section. The first rear face member 40 is integrally fixed to a rear face side of the pad middle portion 22B and, at two ends thereof in the vehicle vertical direction, to inner side faces of the pad end portions 22A (the face of each pad end portion 22A at the side thereof at which the pad middle portion 22B is disposed).

The first rear face member 40 is provided with a main body portion 42 and an extension portion 44. The main body portion 42 is integrally fixed to the rear face side of the pad middle portion 22B and the inner face side of each pad end portion 22A. The extension portion 44 extends from the main body portion 42 that is integrally fixed to the pad member 22 and is folded back to a side of the frame member 14 at which a rear face 14B thereof is formed.

Clip holes 14H and 44H are provided in the frame member 14 and the extension portion 44 of the first rear face member 40. The clip holes 14H and 44H serve as respective insertion holes through which a clip 50 that serves as a fixing member is inserted. The clip hole 14H and clip hole 44H are provided at positions that correspond with one another in the state in which the extension portion 44 is folded back. The extension portion 44 is fixed to the frame member 14 by the clip 50 being inserted through the clip hole 14H and the clip hole 44H, as illustrated in FIG. 1. Thus, the pad member 22 may be assuredly fixed at the frame member 14 via the first rear face member 40.

The trim cover 30 is formed of cloth, leather, synthetic leather or the like. The trim cover 30 is provided with a first trim cover 32 that serves as a first cover skin and a second trim cover 34 that serves as a second cover skin. The first trim cover 32 covers the front face side of the pad member 22 (the front face side of the pad member having the integrated rear face member 20), and the second trim cover 34 covers the rear face side of the pad member having the integrated rear face member 20 (the side thereof at which the first rear face member 40 is disposed). The trim cover 30 includes stitched portions 36 at which the first trim cover 32 and the second trim cover 34 are stitched, at the upper end and lower end of the rear face side of the pad member having the integrated rear face member 20.

—Fabrication Method of the Pad Member Having the Integrated Rear Face Member—

Figure 2:
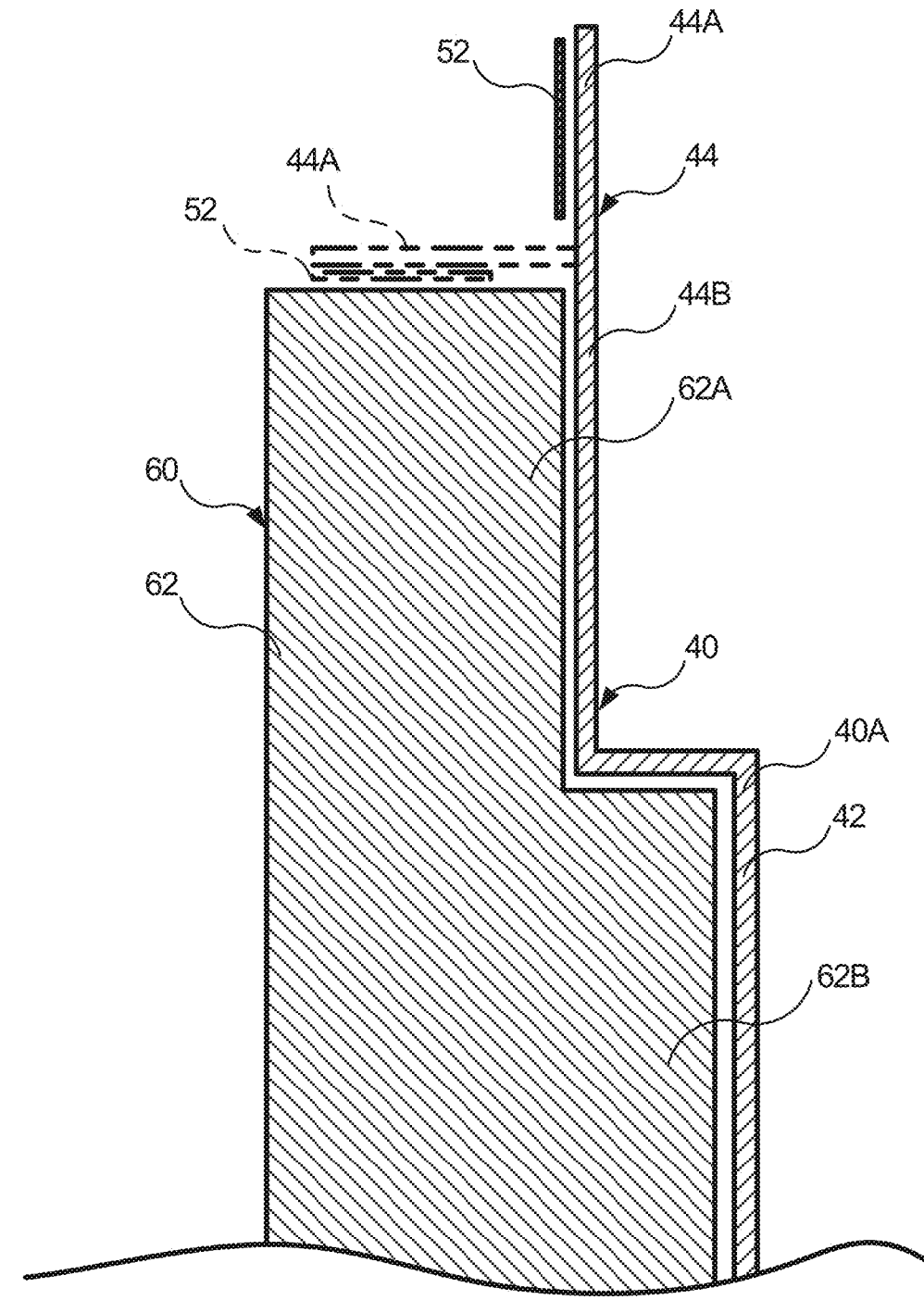
FIG. 2 is a (first) schematic vertical sectional view of principal portions, showing a molding procedure of a pad member having an integrated rear face member according to the first exemplary embodiment.
Figure 3:
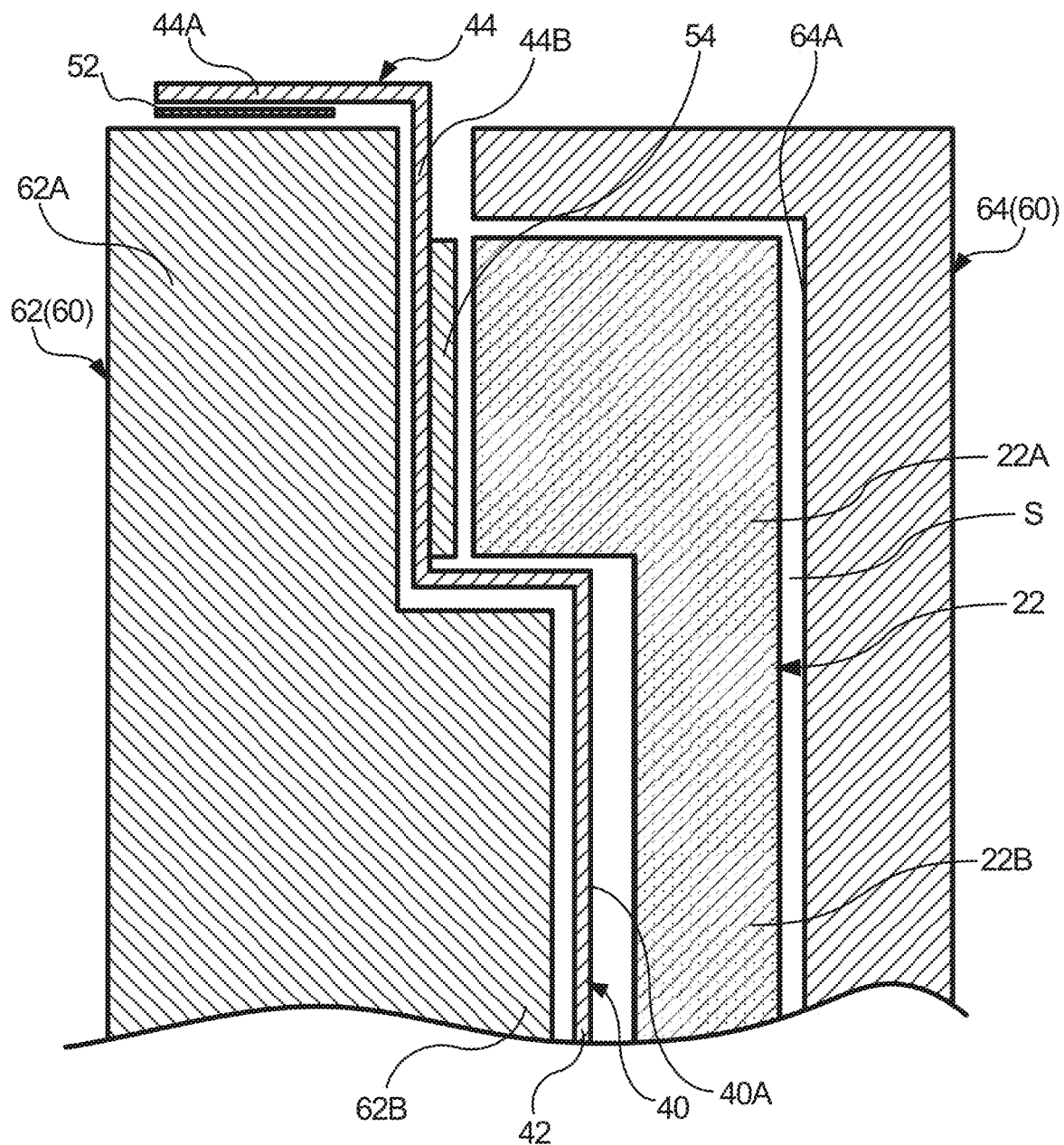
FIG. 3 is a (second) schematic vertical sectional view of principal portions, showing the molding procedure of the pad member having the integrated rear face member according to the first exemplary embodiment.

As illustrated in FIG. 2 and FIG. 3, the pad member having the integrated rear face member 20 according to the first exemplary embodiment is formed by a molding apparatus (not shown in the drawings) equipped with a molding die 60. The molding die 60 includes an upper die 62 and a lower die 64.

As shown in FIG. 3, the upper die 62 includes an upper die main body portion 62A and an upper die middle portion 62B. The upper die main body portion 62A is disposed at an upper side. The upper die middle portion 62B is formed with a smaller outer diameter than the upper die main body portion 62A and protrudes to the lower side from the middle of the upper die main body portion 62A. The lower die 64 is formed in a box shape of which the upper side is open.

In the first exemplary embodiment, firstly, as shown in FIG. 2, a principal portion 40A of the first rear face member 40, which excludes a terminal end portion 44A of the extension portion 44, is disposed at the lower face of the upper die 62. More specifically, the principal portion 40A is constituted by an extension main body portion 44B of the extension portion 44 and the main body portion 42. The extension main body portion 44B excludes the terminal end portion 44A. A magnet 52 that serves as a retaining member is fastened to an upper face of the terminal end portion 44A of the extension portion 44, and when the terminal end portion 44A is bent back to the side thereof at which the upper die 62 is disposed, the magnet 52 is attracted to the upper die 62. Thus, the first rear face member 40 is disposed at the upper die 62.

In the first exemplary embodiment, as shown in FIG. 3, a tape member 54 serves as an impregnation prevention member. The tape member 54 is fastened to a surface of the extension main body portion 44B at the opposite side thereof from the side at which the upper die 62 is disposed. In the state in which the tape member 54 has been fastened, the lower die 64 is clamped to the upper die 62. The lower die 64 forms a space S between the upper die 62 and the lower die 64.

Then, as shown in FIG. 3, a foam material such as urethane (resin) or the like that is to form the pad member 22 is injected into the space S. When a predetermined duration has passed and the injected foam material has expanded, the pad member 22 is integrated with the first rear face member 40, and the pad member having the integrated rear face member 20 is completed. As shown in FIG. 3, the first rear face member 40 is a member that is thinner than the upper die 62 and the lower die 64. Therefore, the foam material can expand in the state in which the first rear face member 40 is sandwiched by the upper die 62 and lower die 64.

The tape member 54 is interposed between the expanding foam material and the extension main body portion 44B in the space S formed between the upper die 62 and the lower die 64. Therefore, impregnation of the foam material into the extension main body portion 44B is prevented. Thus, of the first rear face member 40, only the main body portion 42 excluding the terminal end portion 44A and the extension main body portion 44B, that is, excluding the extension portion 44, is integrated with the pad member 22. As shown in FIG. 3, an end portion of the main body portion 42 at the side thereof at which the extension portion 44 is formed is bent back along a peripheral face of the upper die middle portion 62B of the upper die 62.

Subsequently, the magnet 52 is detached from the upper die 62, the molding die 60 is opened up, and the pad member having the integrated rear face member 20 is released from the lower die 64. In this way, the pad member having the integrated rear face member 20 is molded.

—Seat Back Fabrication Method—

Figure 4:
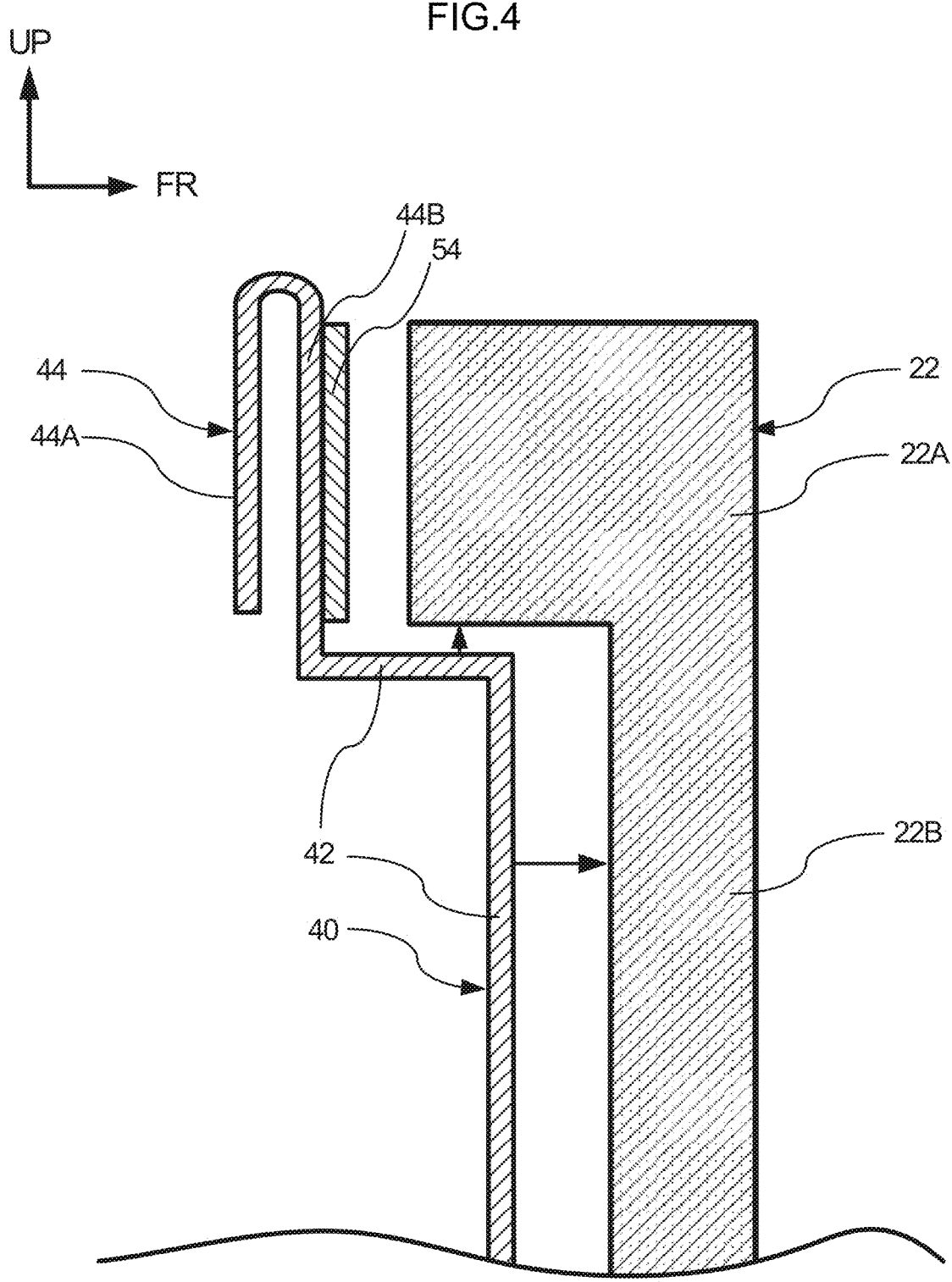
FIG. 4 is a (first) schematic vertical sectional view of principal portions, showing a vehicle seat fabrication method according to the first exemplary embodiment.

Firstly, as described above, the main body portion 42 that is a portion of the first rear face member 40 is integrated with the pad member 22 that is formed of the foam material, molding the pad member having the integrated rear face member 20. As shown in FIG. 4, the main body portion 42 of the first rear face member 40 is integrated with the pad member 22. In FIG. 4, for ease of understanding of the extension portion 44 that is not integrated with the pad member 22, the main body portion 42 and the pad member 22 are depicted as being separated but are actually integrated. As shown in FIG. 4, because impregnation of the foam material into the extension main body portion 44B of the first rear face member 40 is prevented by the tape member 54, the extension main body portion 44B is not integrated with the pad member 22.

Figure 5:
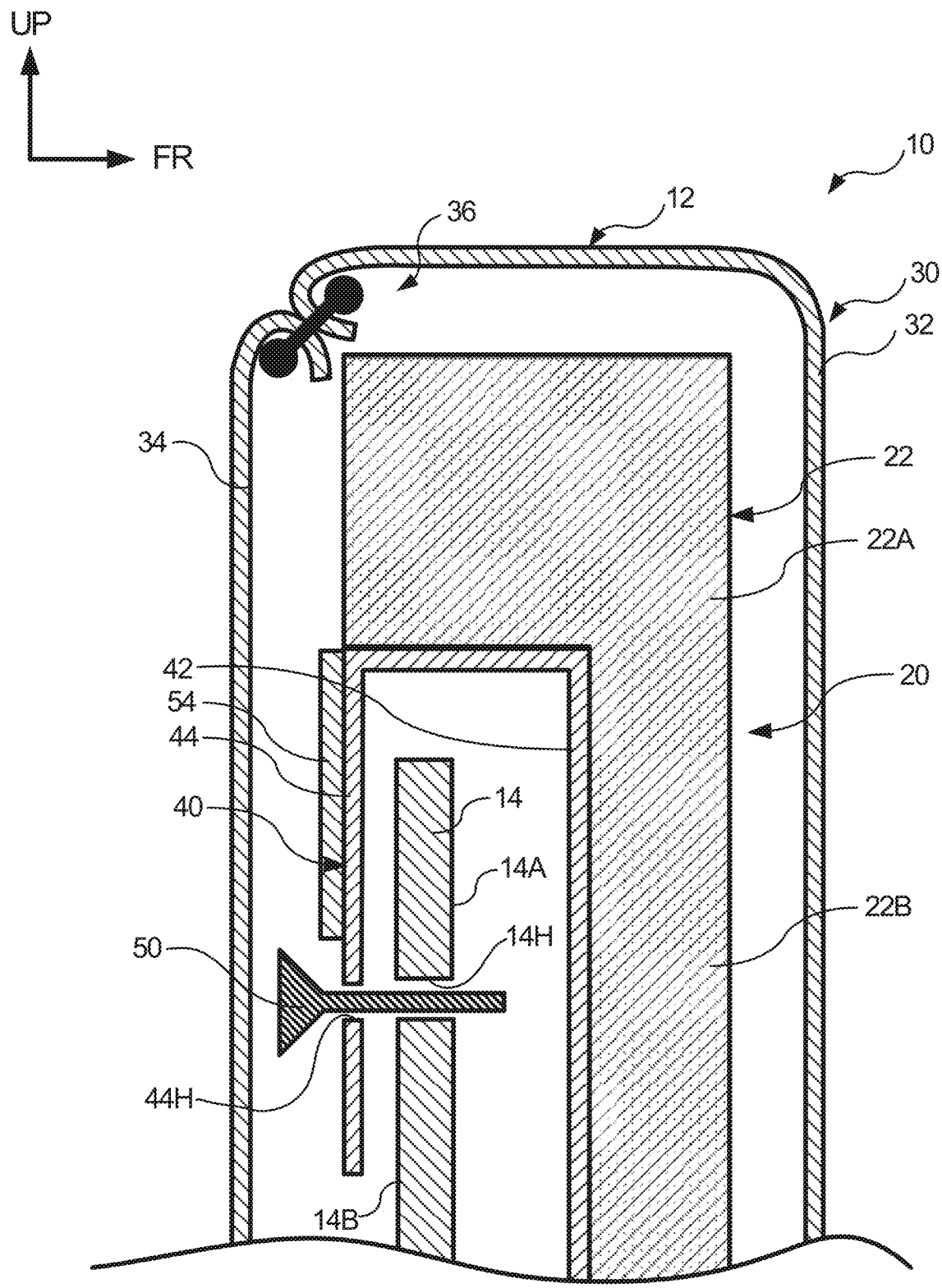
FIG. 5 is a (second) schematic vertical sectional view of principal portions, showing the vehicle seat fabrication method according to the first exemplary embodiment.

Next, as shown in FIG. 5, the main body portion 42 of the pad member having the integrated rear face member 20 is disposed at a side of the frame member 14 at which a front face 14A thereof is formed. The frame member 14 is fabricated of metal and forms the framework of the vehicle seat 10. The extension portion 44 of the first rear face member 40 extending from the main body portion 42 is folded back to the rear face 14B side of the frame member 14. The clip hole 4414 formed in the folded extension portion 44 is positioned at the clip hole 14H formed in the frame member 14, and the extension portion 44 is fixed to the frame member 14 by the clip 50 being inserted through the clip hole 44H and clip hole 14H. Thus, the pad member 22 is assuredly fixed to the frame member 14 via the extension portion 44 of the first rear face member 40.

Next, the pad member having the integrated rear face member 20 that is fixed to the frame member 14 is covered by the trim cover 30 that serves as a cover skin. In this way, the seat back 12 is fabricated. In FIG. 5, the state in Which the tape member 54 is fastened to the extension main body portion 44B of the extension portion 44 is maintained while the seat back 12 is being fabricated. However, the tape member 54 may be detached before the covering with the trim cover 30 (see FIG. 1).

—Operation and Effects—

Now, operational effects according to the structure of the seat back 12 of the vehicle seat 10, at which the vehicle seat structure according to the first exemplary embodiment is employed, the molding method of the pad member having the integrated rear face member 20 and the fabrication method of the seat back 12 of the vehicle seat 10 are described.

In the structure of the seat back 12 according to the first exemplary embodiment, the first rear face member 40 is a rear face member that is integrated with the pad member 22 at the rear face side of the pad member 22 and includes the main body portion 42 and the extension portion 44. The main body portion 42 is fixed to the pad member 22. The extension portion 44 extends from the pad member 22, is folded to the rear face 14B side of the frame member 14, and is fixed to the frame member 14. Thus, the pad member 22 may be assuredly fixed at the frame member 14 via the first rear face member 40.

In the structure of the seat back 12 according to the first exemplary embodiment, the pad member 22 is not in direct contact with the frame member 14 the pad member 22 is fixed to the frame member 14 via the first rear face member 40. Therefore, noise and damage to the pad member 22 due to the frame member 14 and the pad member 22 rubbing together may be prevented.

In the seat back 12 according to the first exemplary embodiment, the frame member 14 and extension portion 44 include the clip holes 14H and 44H through which the clip 50 is inserted at the respective corresponding positions. Therefore, the extension portion 44 may be easily fixed to the frame member 14 by the clip 50 being inserted through the clip holes 14H and 44H.

In the structure of the seat back 12 according to the first exemplary embodiment, the extension portion 44 extends from the pad member 22, is folded back to the rear face 14B side of the frame member 14, and is fixed to the frame member 14. Thus, the frame member 14 is surrounded from the front face 14A side to the rear face 14B side thereof by the first rear face member 40. Therefore, the pad member 22 may be more securely fixed at the frame member 14 via the first rear face member 40.

In the molding method of the pad member having the integrated rear face member 20 according to the first exemplary embodiment, of the first rear face member 40 including the main body portion 42 that is integrated with the pad member 22 and the extension portion 44 that extends from the main body portion 42, the principal portion 40A that excludes the terminal end portion 44A of the extension portion 44 is disposed in the upper die 62. The tape member 54 serving as the impregnation prevention member is fastened to the face of the extension portion 44 excluding the terminal end portion 44A that is at the opposite side thereof from the side at which the upper die 62 is disposed. In this state, the lower die 64 that forms the space S between the upper die 62 and the lower die 64 is clamped to the upper die 62, the foam material is injected into the space 5, and the foam material is expanded. Thus, the tape member 54 is interposed between the expanding foam material and the extension portion 44 excluding the terminal end portion 44A, in the space S formed between the upper die 62 and the lower die 64. Therefore, impregnation of the foam material into the extension portion 44 excluding the terminal end portion 44A may be prevented.

In the molding method of the pad member having the integrated rear face member 20 according to the first exemplary embodiment, the terminal end portion 44A of the extension portion 44 is bent back along the upper die 62 and is retained at the upper die 62 by the magnet 52 serving as the retaining member. Therefore, because the terminal end portion 44A is retained at the upper die 62, the first rear face member 40 may be retained at the upper die 62 easily.

In the molding method of the pad member having the integrated rear face member 20 according to the first exemplary embodiment, the foam material is expanded in the state in which the first rear face member 40 is sandwiched by the upper die 62 and lower die 64. Therefore, it is easy for the foam material to flow uniformly in the space S and expansion defects may be prevented.

In the fabrication method of the seat back 12 according to the first exemplary embodiment, the main body portion 42 that is a portion of the first rear face member 40 is integrated with the pad member 22 formed of the foam material to mold the pad member having the integrated rear face member 20. The main body portion 42 of the pad member having the integrated rear face member 20 is disposed at the front face side of the frame member 14 forming the framework of the vehicle seat, and the extension portion 44 of the first rear face member 40 extending from the main body portion 42 is folded to the rear face side of the frame member 14 and fixed to the frame member 14. Thus, the extension portion 44 of the first rear face member 40 is fixed to the frame member 14, and the pad member 22 is assuredly fixed at the frame member 14 via the first rear face member 40.

Variant Example

Below, a variant example of the first exemplary embodiment is described using FIG. 6 and FIG. 7. Structures that are the same as in the first exemplary embodiment are assigned the same reference symbols and are not described here. Only points that are different are described in detail.

In the first exemplary embodiment described above, the tape member 54 is employed as the impregnation prevention member when the pad member having the integrated rear face member 20 is being molded, but in the variant example a film member 54A is employed instead of the tape member 54.

Figure 6:
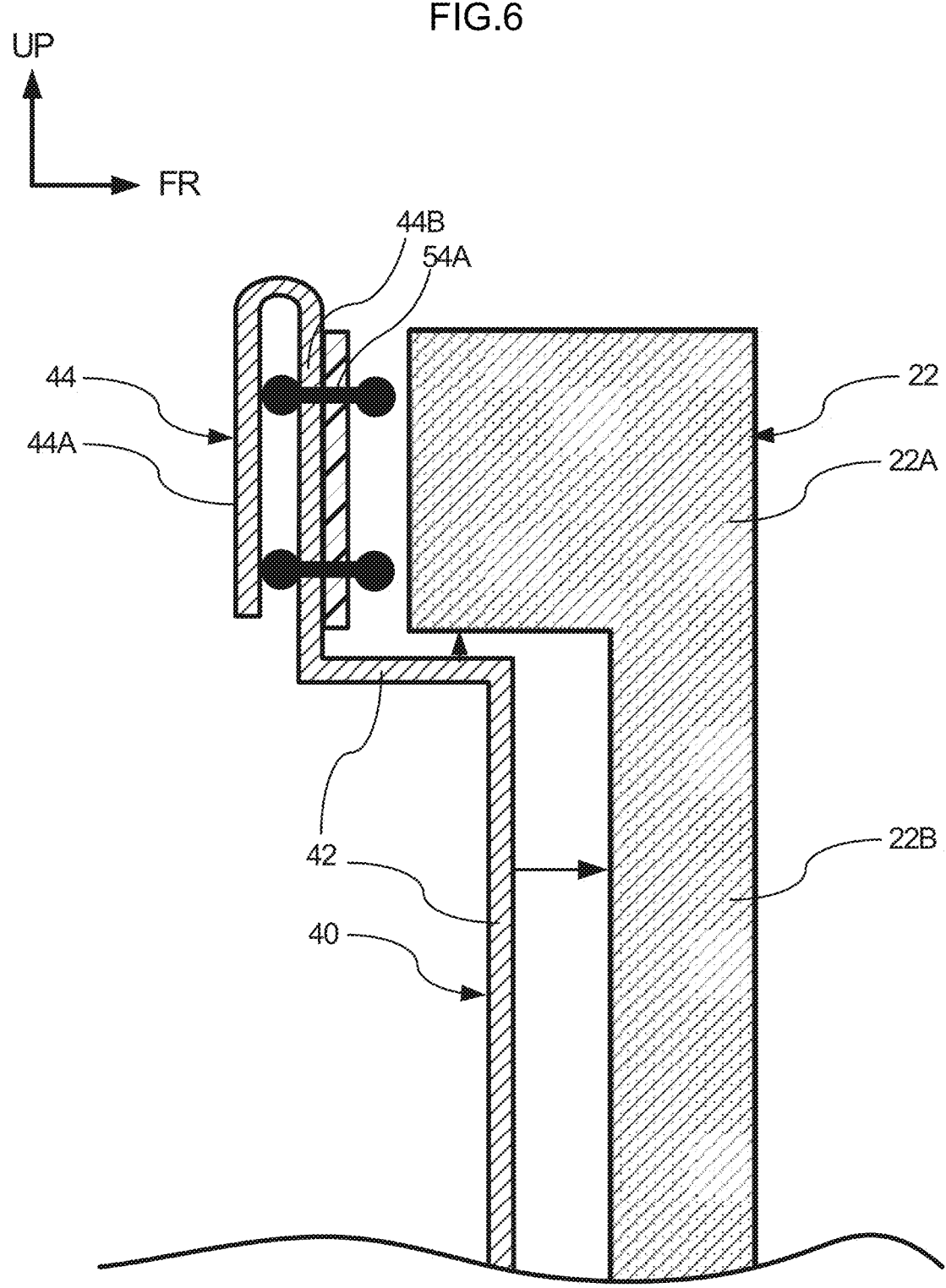
FIG. 6 is a (first) schematic vertical sectional view of principal portions, showing a vehicle seat fabrication method according to a variant example of the first exemplary embodiment.

As illustrated in FIG. 6, the film member 54A serving as the impregnation prevention member is stitched to the extension main body portion 44B. In the variant example, the lower die 64 that forms the space S between the upper die 62 and the lower die 64 is clamped to the upper die 62 (see FIG. 3) in the state in which the film member 54A is stitched on.

In a fabrication method of the seat back 12 according to the variant example, the main body portion 42 that is a portion of the first rear face member 40 is integrated with the pad member 22 that is formed of the foam material, molding the pad member having the integrated rear face member 20. As shown in FIG. 6, the main body portion 42 of the first rear face member 40 is integrated with the pad member 22. In FIG. 6, for ease of understanding of the extension portion 44 that is not integrated with the pad member 22, the main body portion 42 and the pad member 22 are depicted as being separated but are actually integrated. As shown in FIG. 6, because impregnation of the foam material into the extension main body portion 44B of the first rear face member 40 is prevented by the film member 54A, the extension main body portion 44B is not integrated with the pad member 22.

Figure 7:
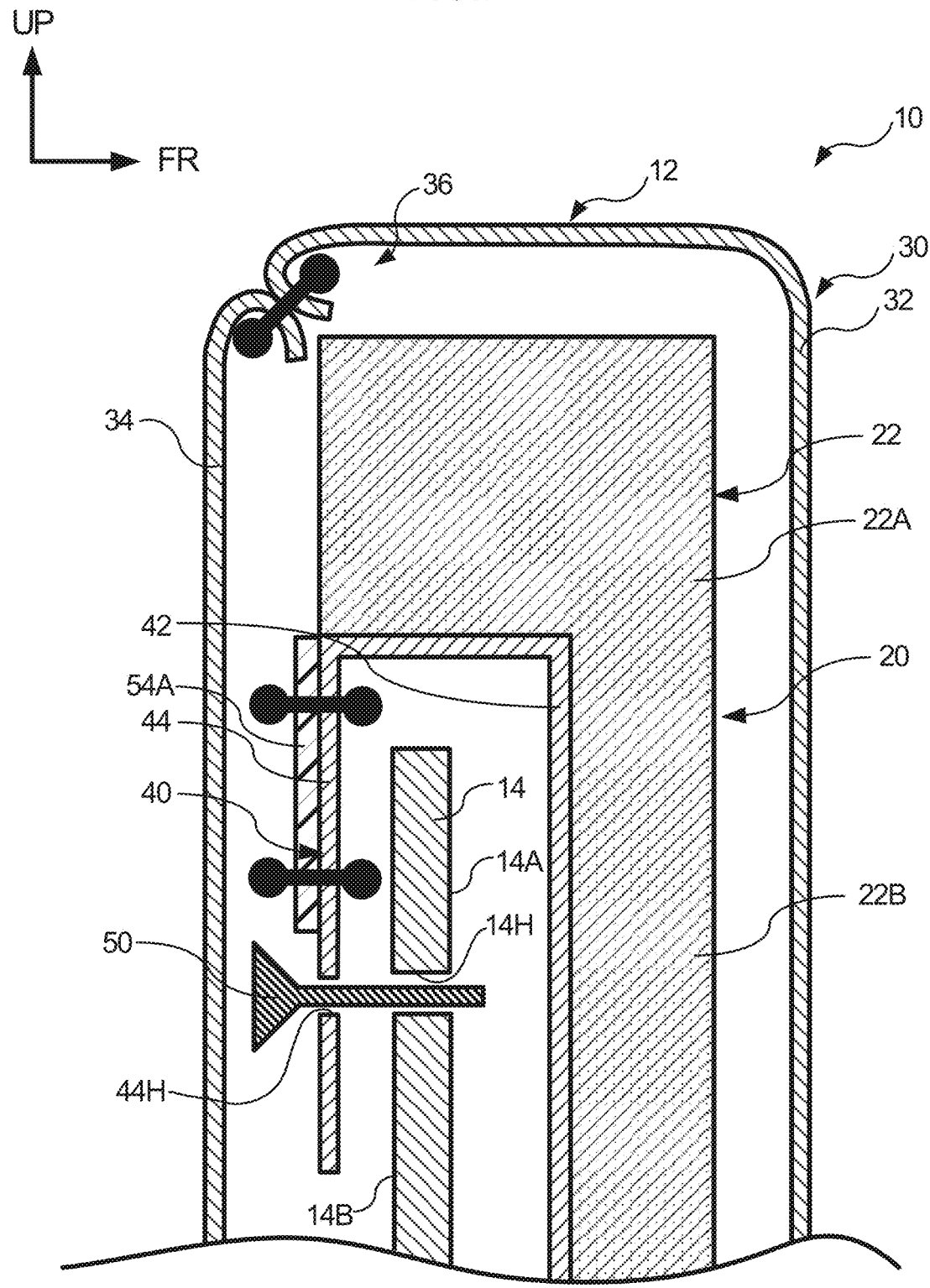
FIG. 7 is a (second) schematic vertical sectional view of principal portions, showing the vehicle seat fabrication method according to the variant example of the first exemplary embodiment.

Next, as shown in FIG. 7, the main body portion 42 of the pad member having the integrated rear face member 20 is disposed at the front face 14A side of the frame member 14. The frame member 14 is fabricated of metal and forms the framework of the vehicle seat 10. In the state in which the film member 54A is stitched on, the extension portion 44 of the first rear face member 40 extending from the main body portion 42 is folded back to the rear face 14B side of the frame member 14. The clip hole 44H formed in the folded extension portion 44 is positioned at the clip hole 14H formed in the frame member 14, and the extension portion 44 is fixed to the frame member 14 by the clip 50 being inserted through the clip hole 44H and clip hole 14H. Thus, the pad member 22 is assuredly fixed to the frame member 14 via the extension portion 44 of the first rear face member 40.

Next, the pad member having the integrated rear face member 20 that is fixed to the frame member 14 is covered by the trim cover 30 that serves as a cover skin. In this way, the seat back 12 according to the variant example is fabricated.

In the variant example, the film member 54A serving as the impregnation prevention member is interposed between the expanding foam material and the extension portion 44 excluding the terminal end portion 44A, in the space S formed between the upper die 62 and the lower die 64. Therefore, similarly to the first exemplary embodiment, impregnation of the foam material into the extension portion 44 excluding the terminal end portion 44A may be prevented.

Second Exemplary Embodiment

Below, a seat back of a vehicle seat in which a vehicle seat structure according to a second exemplary embodiment is employed is described using FIG. 8. In the drawing, gaps are depicted between members but in reality these gaps are absent and the members are fixed in contact. In the second exemplary embodiment, structures that are the same as in the first exemplary embodiment are assigned the same reference symbols and are not described here. Only points that are different are described in detail.

In a seat back 12A of a vehicle seat 10A according to the second exemplary embodiment, structure of a first rear face member 70 of a pad member having the integrated rear face member 20A differs from the first rear face member 40 of the pad member having the integrated rear face member 20 according to the first exemplary embodiment.

Figure 8:
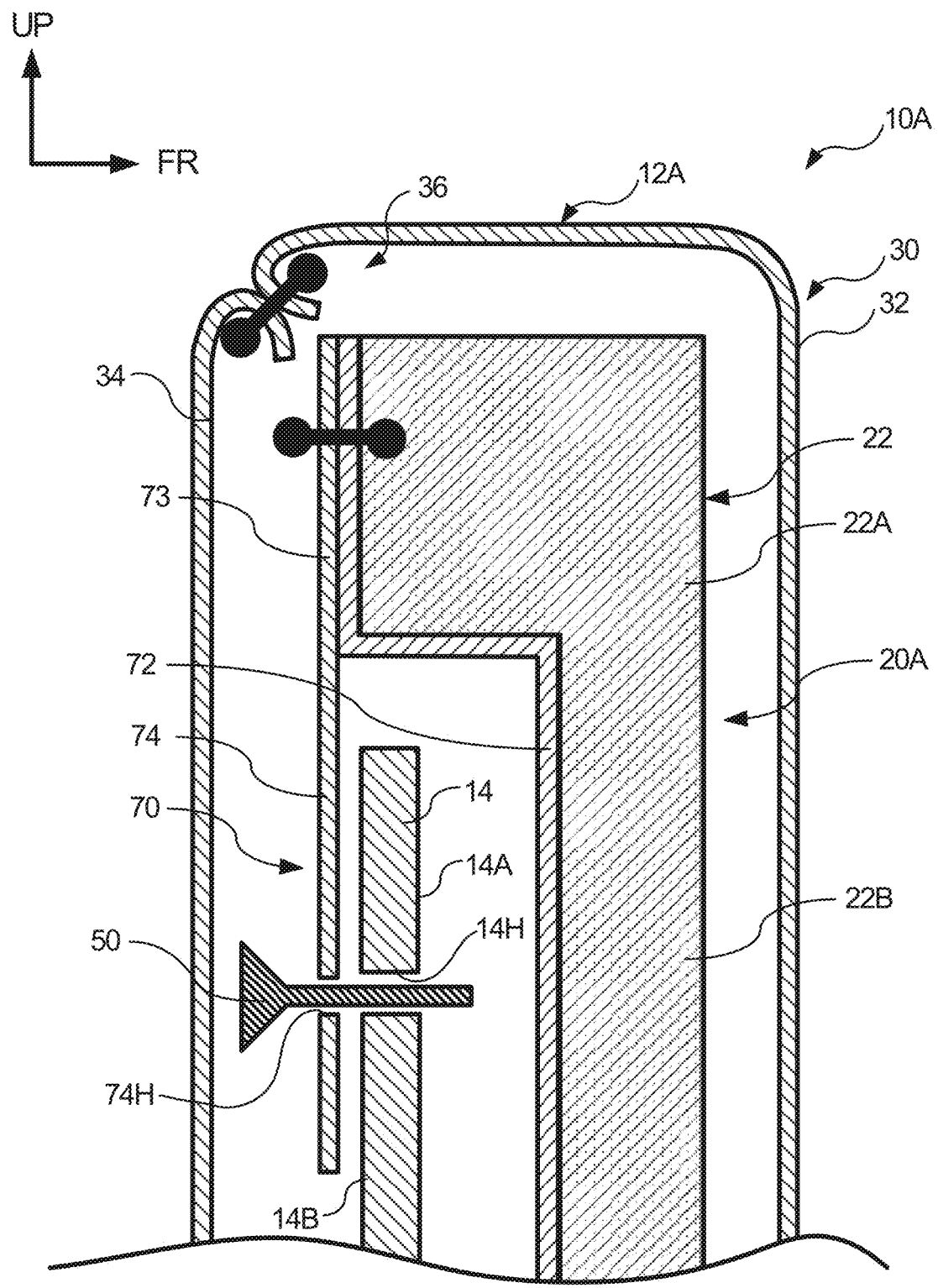
FIG. 8 is a schematic vertical sectional view of principal portions, schematically showing a portion of a seat back at which a vehicle seat structure according to a second exemplary embodiment is employed.

As shown in FIG. 8, the first rear face member 70 is provided with a main body portion 72, a fastened portion 73 and an extension portion 74. The main body portion 72 is integrally fixed to the pad member 22. The fastened portion 73 is fastened by being stitched to the main body portion 72 at an end portion of the main body portion 72. The extension portion 74 extends from the fastened portion 73. That is, the main body portion 72 and extension portion 74 of the first rear face member 70 are structured by separate members.

The main body portion 72 is integrally fixed to the pad member 22 at the rear face side of the pad middle portion 22B, the inner side face of the pad end portion 22A and the rear face side of the pad end portion 22A. The extension portion 74 extends from the fastened portion 73 that is fastened to the main body portion 72 that is integrally fixed to the pad member 22. The extension portion 74 extends to the rear face 14B side of the frame member 14. The main body portion 72 and extension portion 74 of the first rear face member 70 are integrated by the fastened portion 73. Thus, the extension portion 74 serves as a rear face member that is folded back to the rear face 14B side of the frame member 14.

Clip holes 14H and 7414 are provided at the frame member 14 and the extension portion 74 of the first rear face member 70. The clip holes 14H and 74H serve as respective insertion holes through which the clip 50 that serves as the fixing member is inserted. The clip hole 14H and clip hole 74H are provided at positions that correspond with one another in the state in which the extension portion 74 is folded back. The extension portion 74 is fixed to the frame member 14 by the clip 50 being inserted through the clip hole 14H and the clip hole 74H, as illustrated in FIG. 8. Thus, the pad member 22 may be assuredly fixed at the frame member 14 via the first rear face member 70.

—Operation and Effects—

Now, operational effects of the seat back 12A of the vehicle seat 10A at which the vehicle seat structure according to the second exemplary embodiment is employed are described.

In the structure of the seat back 12A according to the second exemplary embodiment, the extension portion 74 that is fixed to the frame member 14 and the main body portion 72 that is fixed to the pad member 22 are constituted by separate members. Therefore, freedom of selection of a material to be used for the extension portion 74 may be increased. Thus, an optimal material for fixing to the frame member 14 may be selected for the extension portion 74, and the pad member 22 may be more assuredly fixed at the frame member 14 via the extension portion 74. When the extension portion 74 and the frame member 14 are to be fixed by the clip 50, position management of the clip holes 14H and 74H may be administered at the extension portion 74 alone. Therefore, position management of the clip holes 14H and 74H may be easier than in a structure in which the main body portion 72 and the extension portion 74 are integrally structured.

Third Exemplary Embodiment

Below, a seat back of a vehicle seat in which a vehicle seat structure according to a third exemplary embodiment is employed is described using FIG. 9. In the drawings, gaps are depicted between members but in reality these gaps are absent and the members are fixed in contact. In the third exemplary embodiment, structures that are the same as in the second exemplary embodiment are assigned the same reference symbols and are not described here. Only points that are different are described in detail.

—Seat Back Structure—

Figure 9:
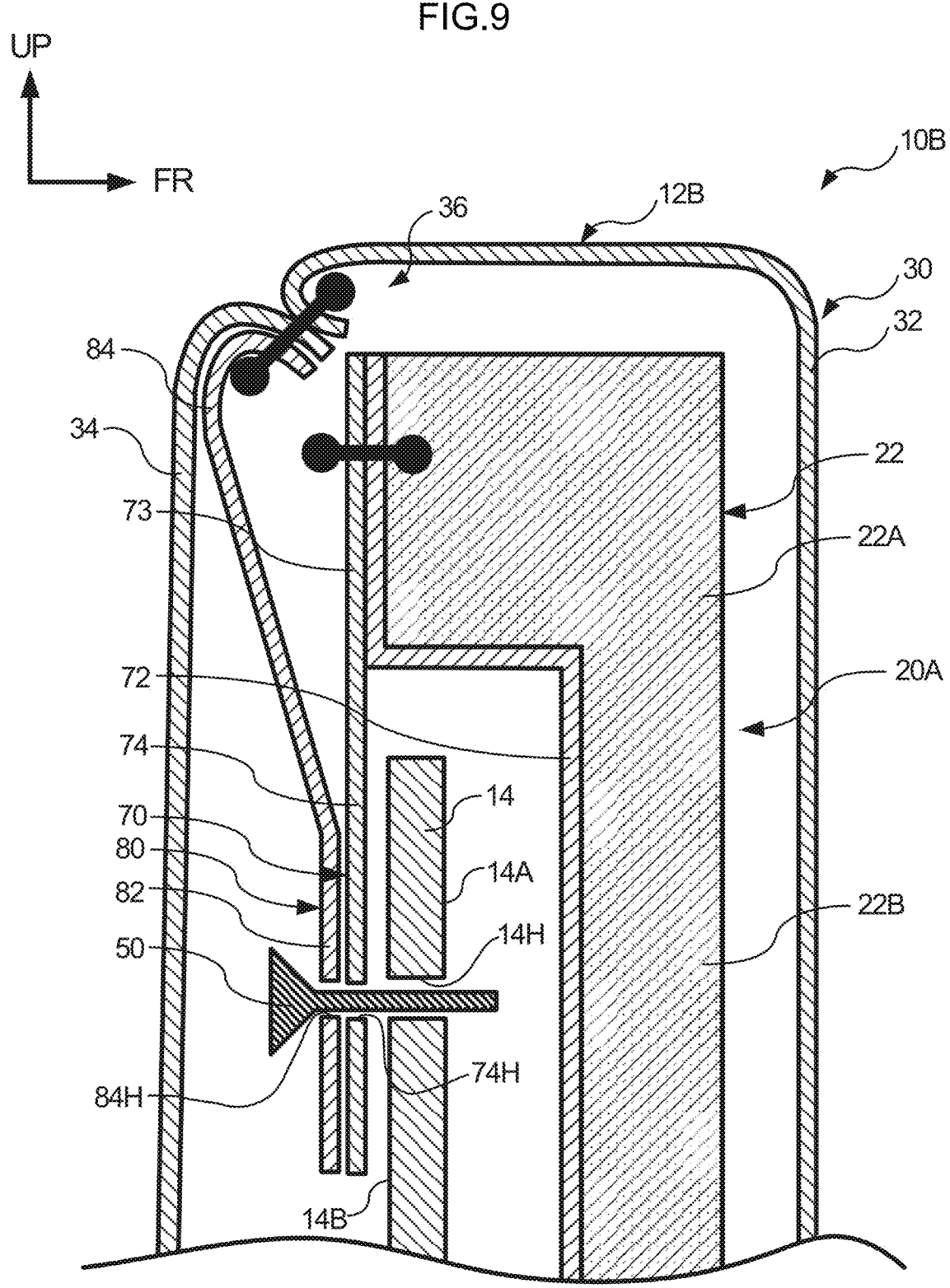
FIG. 9 is a schematic vertical sectional view of principal portions, schematically showing a portion of a seat back at which a vehicle seat structure according to a third exemplary embodiment is employed.

In a seat back 12B of a vehicle seat 10B according to the third exemplary embodiment, as shown in FIG. 9, a second rear face member 80 is provided in addition to the structures of the seat back 12A according to the second exemplary embodiment. The second rear face member 80 is formed of, for example, a carpet, and is disposed between the extension portion 74 of the first rear face member 70 and the second trim cover 34.

A clip hole 84H is provided in one end portion 82 of the second rear face member 80. The second rear face member 80 is fixed to the frame member 14 together with the extension portion 74 by the clip 50 being inserted through the clip hole 84H. Another end portion 84 of the second rear face member 80 is disposed at the side of the second rear face member 80 at which the stitched portion 36 is disposed, at which the first trim cover 32 and second trim cover 34 are stitched. The second rear face member 80 is stitched to the inner side of the second trim cover 34 at the another end portion 84.

—Seat Back Fabrication Method—

First, the main body portion 72 that is a portion of the first rear face member 70 is integrated with the pad member 22 that is formed of the foam material, molding the pad member having the integrated rear face member 20A. As shown in FIG. 9, the main body portion 72 of the first rear face member 70 is integrated with the pad member 22 but the extension portion 74 of the first rear face member 70 is not integrated with the pad member 22.

Next, as shown in FIG. 9, the main body portion 72 of the pad member having the integrated rear face member 20A is disposed at the front face 14A side of the frame member 14. The frame member 14 is fabricated of metal and forms the framework of the vehicle seat 10. The extension portion 74 of the first rear face member 70, extending from the fastened portion 73 that is fastened to the main body portion 72, is disposed at the rear face 14B side of the frame member 14.

The second rear face member 80 is disposed between the extension portion 74 and the second trim cover 34. The clip hole 84H formed in the one end portion 82 of the second rear face member 80 is positioned with the clip hole 74H formed in the extension portion 74 and the clip hole 14H formed in the frame member 14, and the clip 50 is inserted through the clip hole 84H, clip hole 74H and clip hole 14H. Thus, the one end portion 82 of the second rear face member 80 and the extension portion 74 of the first rear face member 70 are fixed to the frame member 14.

Next, the pad member having the integrated rear face member 20A that is fixed to the frame member 14 is covered by the trim cover 30 that serves as the cover skin. At this time, the another end portion 84 of the second rear face member 80 is stitched to the inner side of the second trim cover 34 together with the stitched portion 36 at which the first trim cover 32 and second trim cover 34 are stitched. In this way, the seat back 12B is fabricated.

—Operation and Effects—

Now, operational effects of the seat back 12B of the vehicle seat 10B at which the vehicle seat structure according to the third exemplary embodiment is employed are described.

In the structure of the seat back 12B and the fabrication method of the vehicle seat 10B according to the third exemplary embodiment, the second rear face member 80 is disposed between the extension portion 74 and the second trim cover 34, the one end portion 82 of the second rear face member 80 is fixed to the frame member 14 together with the extension portion 74, and the another end portion 84 of the second rear face member 80 is stitched to the inner side of the second trim cover 34 together with the stitched portion 36 at which the first trim cover 32 and second trim cover 34 are stitched.

Therefore, the first trim cover 32 and second trim cover 34 are fixed at the frame member 14 by the second rear face member 80. Thus, because the front face side of the pad member 22 is covered by the first trim cover 32 that is fixed at the frame member 14, the pad member 22 is fixed at the frame member 14 by the first trim cover 32. Accordingly, the pad member 22 is fixed at the frame member 14 by the first rear face member 70 and by the second rear face member 80 and first trim cover 32, and mispositioning of the pad member 22 may be doubly prevented.

The another end portion 84 of the second rear face member 80 is stitched together with the stitched portion 36. The another end portion 84 of the second rear face member 80 is stitched to the inner side of the second trim cover 34 at the stitched portion 36. Therefore, sinking of the stitched portion 36 of the second trim cover 34 to the inner side may be suppressed by the another end portion 84 of the second rear face member 80, and the external appearance may be excellently finished.

Fourth Exemplary Embodiment

Below, a seat back of a vehicle seat in which a vehicle seat structure according to a fourth exemplary embodiment is employed is described using FIG. 10. In the drawing, gaps are depicted between members but in reality these gaps are absent and the members are fixed in contact. In the fourth exemplary embodiment, structures that are the same as in the first exemplary embodiment are assigned the same reference symbols and are not described here, Only points that are different are described in detail.

In a seat back 12C of a vehicle seat 10C according to the fourth exemplary embodiment, structure of a first rear face member 90 differs from the first rear face member 40 according to the first exemplary embodiment.

Figure 10:
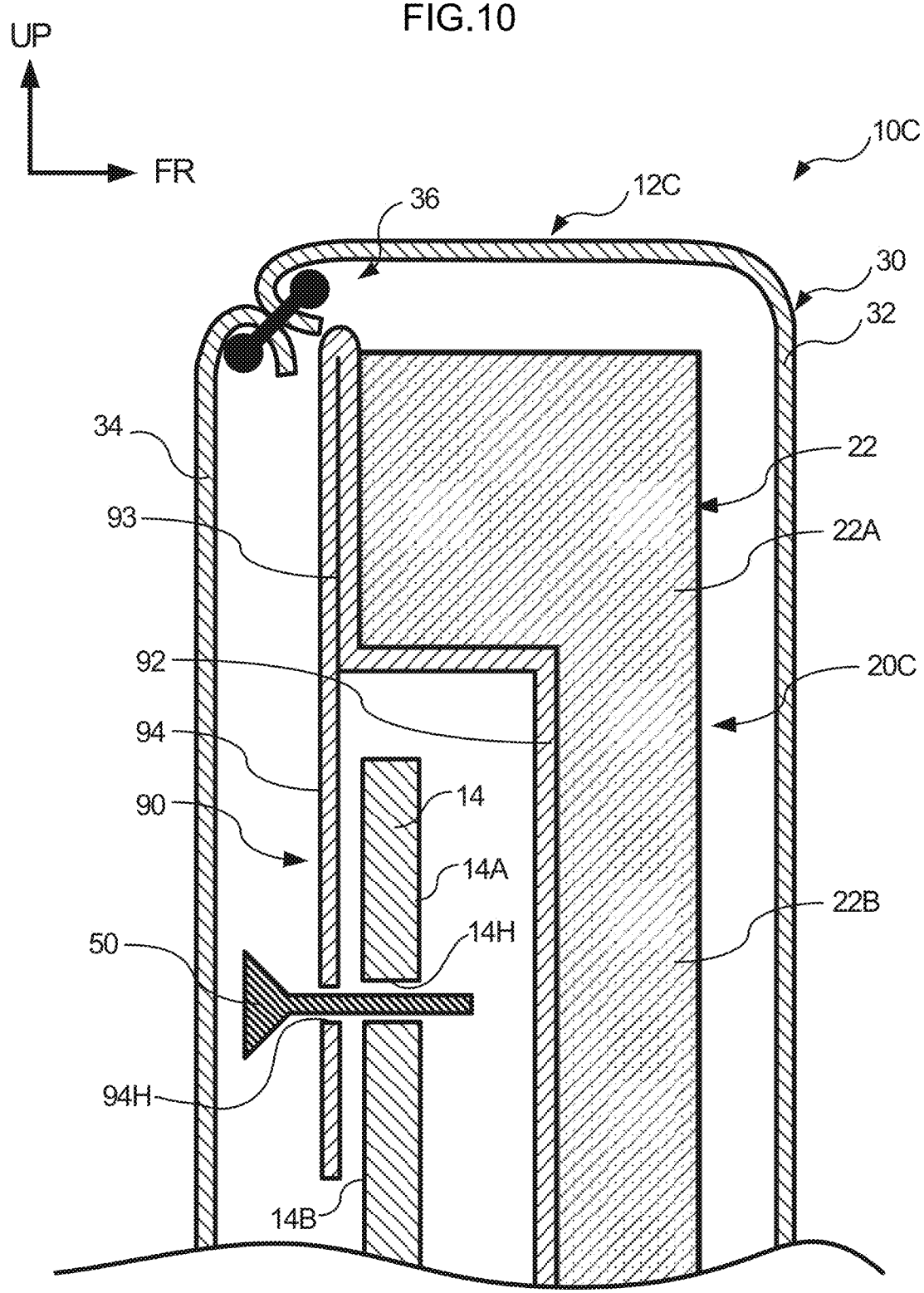
FIG. 10 is a schematic vertical sectional view of principal portions, schematically showing a portion of a seat back at which a vehicle seat structure according to a fourth exemplary embodiment is employed.

As shown in FIG. 10, the first rear face member 90 according to the fourth exemplary embodiment is provided with a main body portion 92, an extension portion 94 and a folded portion 93. The main body portion 92 is integrally fixed to the pad member 22. The extension portion 94 extends from the main body portion 92 that is integrally fixed to the pad member 22. The folded portion 93 is formed between the main body portion 92 and extension portion 94 and is folded in a vicinity of an end portion of the pad member 22.

The main body portion 92 is integrally fixed to the pad member 22 at the rear face side of the pad middle portion 22B, the inner side face of the pad end portion 22A, and the rear face side of the pad end portion 22A. The folded portion 93 extends from the main body portion 92 so as to be folded back in the vicinity of the end portion of the pad member 22, such that the rear face member is doubled up. The folded portion 93 is fastened to the main body portion 92. The extension portion 94 extends from the folded portion 93 and extends to the rear face 14B side of the frame member 14. This extension portion 94 of the first rear face member 90 serves as a rear face member that is folded back to the rear face 14B side of the frame member 14.

—Operation and Effects—

Now, operational effects of the seat back 12C of the vehicle seat 10C at which the vehicle seat structure according to the fourth exemplary embodiment is employed are described.

In the structure of the seat back 12C according to the fourth exemplary embodiment, because the rear face member includes the folded portion 93 at which the rear face member is doubled up between the main body portion 92 and the extension portion 94, position management of a fixing position when the extension portion 94 is being fixed to the frame member 14 may be easier than in a structure without the folded portion 93.

Fifth Exemplary Embodiment

Below, a seat back of a vehicle seat in which a vehicle seat structure according to a fifth exemplary embodiment is employed is described using FIG. 11. In the drawing, gaps are depicted between members but in reality these gaps are absent and the members are fixed in contact. In the fifth exemplary embodiment, structures that are the same as in the fourth exemplary embodiment are assigned the same reference symbols and are not described here. Only points that are different are described in detail.

In a seat back 12D of a vehicle seat 10D according to the fifth exemplary embodiment, structure of a first rear face member 90A differs from the first rear face member 90 according to the fourth exemplary embodiment.

Figure 11:
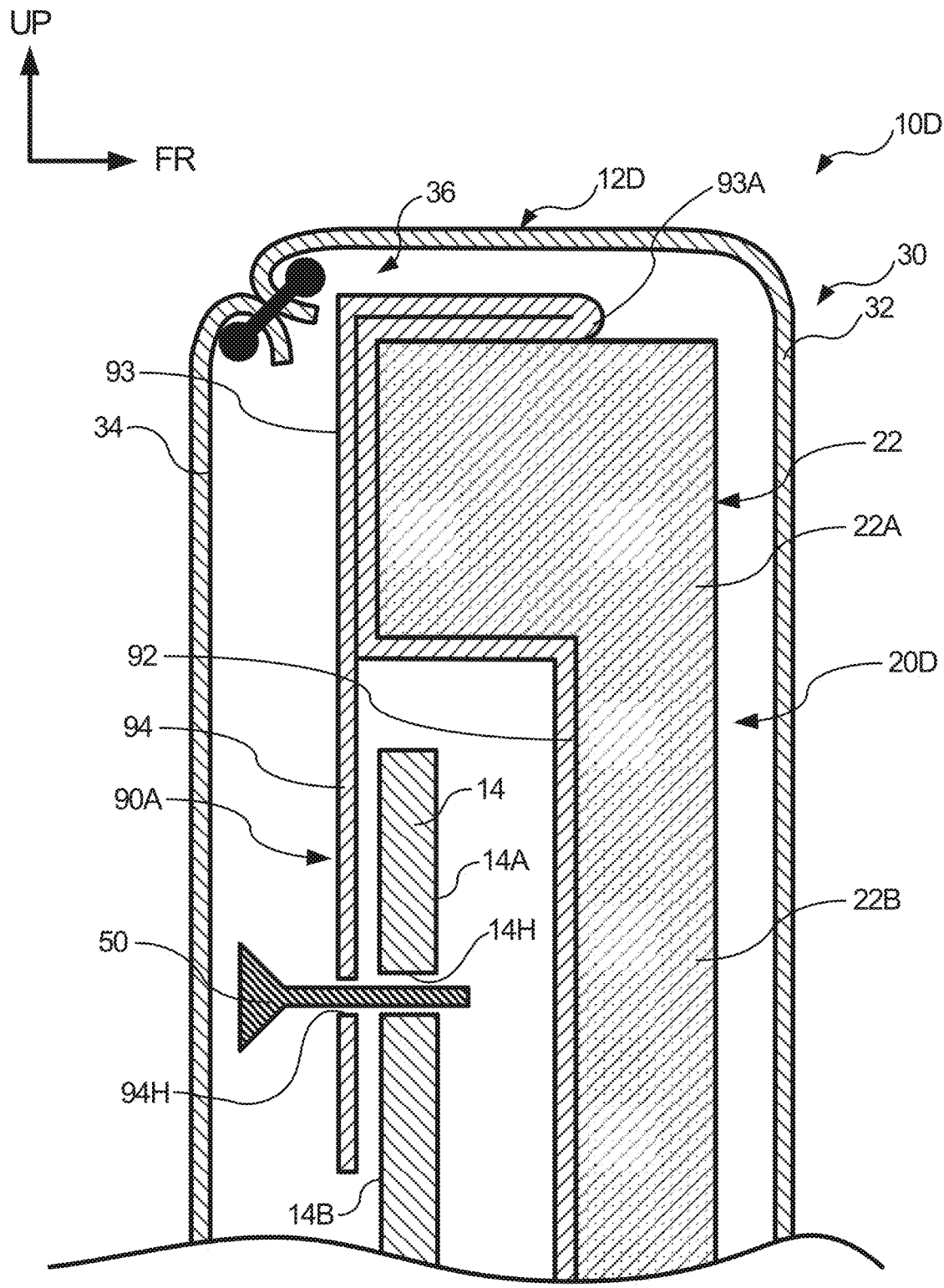
FIG. 11 is a schematic vertical sectional view of principal portions, schematically showing a portion of a seat back at which a vehicle seat structure according to a fifth exemplary embodiment is employed.

As shown in FIG. 11, a foldback position of the folded portion 93 of the first rear face member 90A according to the fifth exemplary embodiment, that is, an end portion 93A of the folded portion 93, is disposed at a position set apart from a corner portion of the rear face side (hack face side) of the pad member 22. In the fifth exemplary embodiment, the end portion 93A is disposed at a face at a vehicle vertical direction end portion side (an outer side) of the pad end portion 22A of the pad member 22. The end portion 93A is disposed a little to the front side relative to the center of the pad end portion 22A in the vehicle front-and-rear direction.

The main body portion 92 is integrally fixed to the pad member 22 at the rear face side of the pad middle portion 22B, the inner face side of the pad end portion 22A, the rear face side of the pad end portion 22A and the outer side of the pad end portion 22A. The folded portion 93 extends from the main body portion 92 that is integrally fixed to the pad member 22, the folded portion 93 is folded back at the face at the vehicle vertical direction end portion side (outer side) of the pad end portion 22A of the pad member 22, and the folded portion 93 is fastened to the main body portion 92 such that the rear face member is doubled up. The extension portion 94 extends from the folded portion 93 and extends to the rear face 14B side of the frame member 14. This extension portion 94 of the first rear face member 90A serves as a rear face member that is folded back at the rear face 14B side of the frame member 14.

—Operation and Effects—

Now, operational effects of the seat back 12D of the vehicle seat 10D at which the vehicle seat structure according to the fifth exemplary embodiment is employed are described.

In the structure of the seat back 12D according to the fifth exemplary embodiment, because the end portion 93A of the folded portion 93 is disposed at a position set apart from the corner portion of the back face side, the end portion 93A of the folded portion 93 may be disposed to avoid the corner portion, at which loads concentrate.

Sixth Exemplary Embodiment

Below, a seat back of a vehicle seat in which a vehicle seat structure according to a sixth exemplary embodiment is employed is described using FIG. 12. In the sixth exemplary embodiment, structures that are the same as in the first exemplary embodiment shown in FIG. 1 are assigned the same reference symbols and are not described here. Only points that are different are described in detail.

In a seat back 12E of a vehicle seat 10E according to the sixth exemplary embodiment, structures of a first rear face member 100 and a frame member 15 differ from the first rear face member 40 and frame member 14 according to the first exemplary embodiment.

Figure 12:
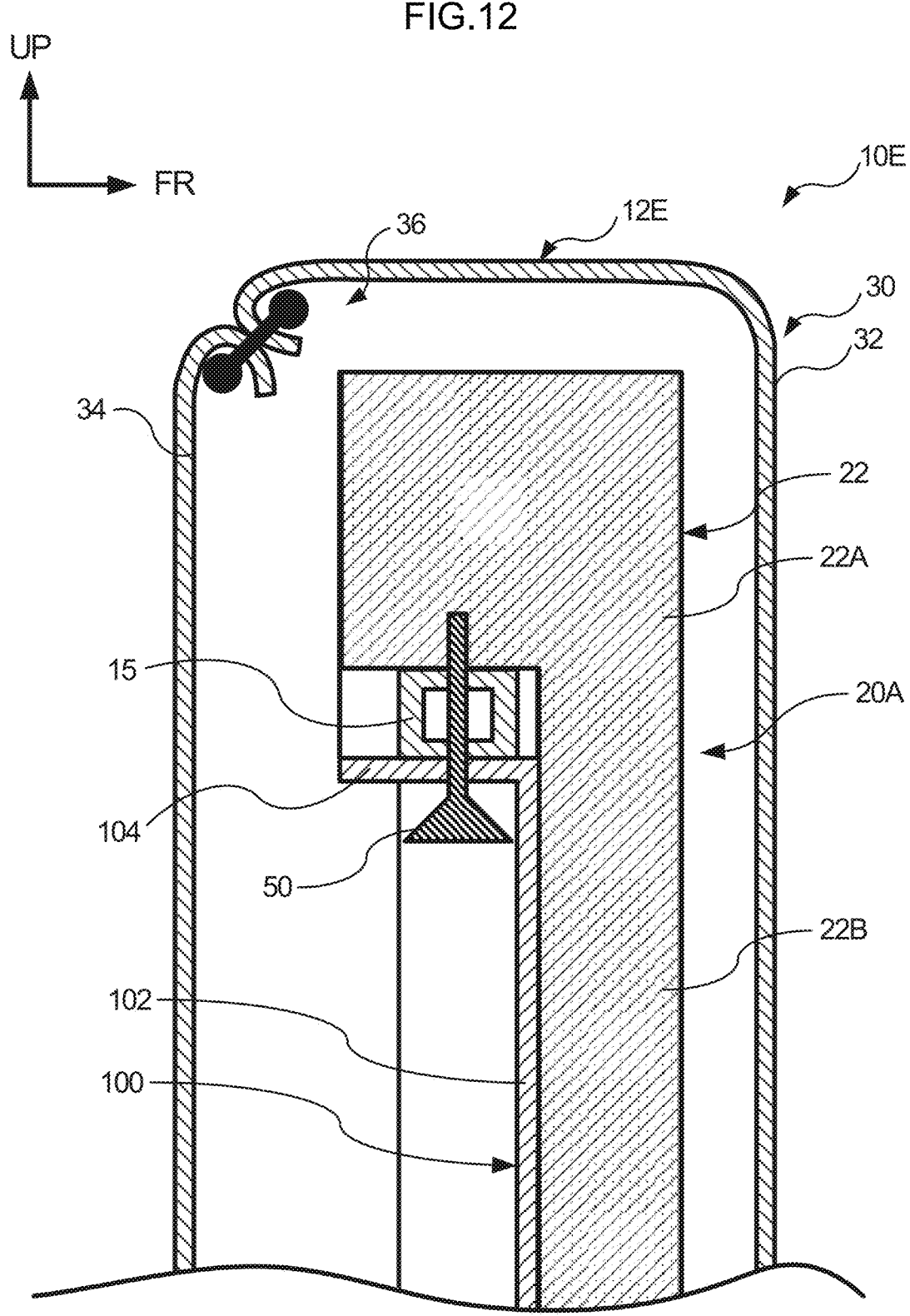
FIG. 12 is a schematic vertical sectional view of principal portions, schematically showing a portion of a seat back at which a vehicle seat structure according to a sixth exemplary embodiment is employed.

As shown in FIG. 12, the frame member 15 according to the sixth exemplary embodiment is formed of a square pipe. The first rear face member 100 is equipped with a main body portion 102 and an extension portion 104. The main body portion 102 is integrally fixed to the rear face side of the pad middle portion 22B. The extension portion 104 extends substantially perpendicularly from the main body portion 102 that is integrally fixed to the pad member 22.

Clip holes (not shown in the drawing) are respectively provided in the frame member 15 and the extension portion 104 of the first rear face member 100, and the clip 50 serving as the fixing member is inserted through the clip holes. The clip holes are provided at positions that correspond with one another. The extension portion 104 is fixed to the frame member 15 by the clip 50 being inserted through the clip holes. Thus, the pad member 22 may be assuredly fixed to the frame member 15 via the first rear face member 100.

—Operation and Effects—

Now, operational effects of the seat back 12E of the vehicle seat 10E at which the vehicle seat structure according to the sixth exemplary embodiment is employed are described.

In the structure of the seat back 12F according to the sixth exemplary embodiment, the first rear face member 100 is a rear face member that is integrated with the pad member 22 at the rear face side of the pad member 22. The first rear face member 100 includes the main body portion 102 that is fixed to the pad member 22 and the extension portion 104 that extends from the pad member 22 and is fixed to the frame member 15. According to the structure of the seat back 12E according to the sixth exemplary embodiment, the pad member 22 may be assuredly fixed at the frame member 15 via the first rear face member 100. In addition, according to the structure of the seat back 12E according to the sixth exemplary embodiment, similar effects to the first exemplary embodiment may be provided.

Seventh Exemplary Embodiment

Figure 13:
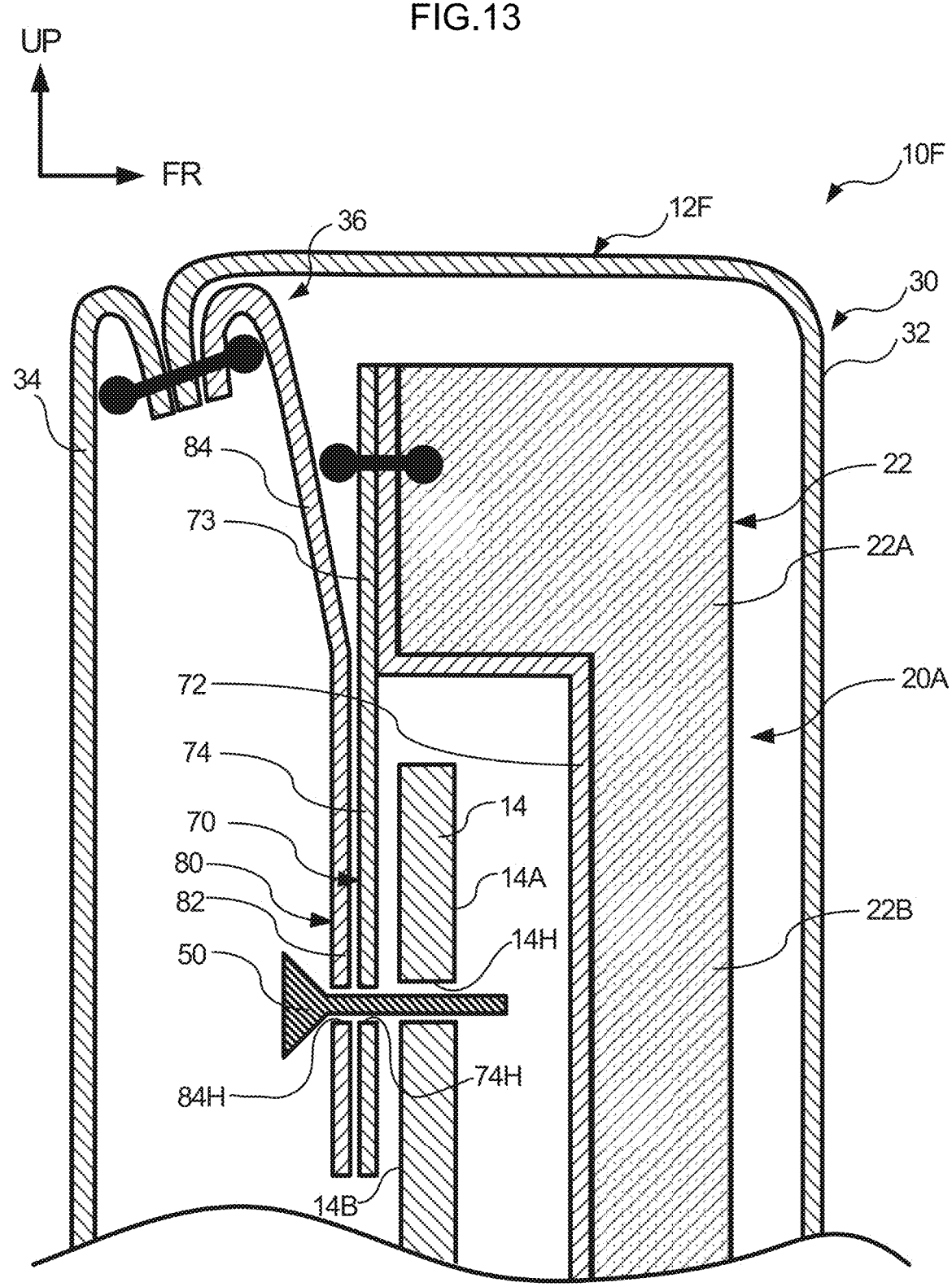
FIG. 13 is a schematic vertical sectional view of principal portions, schematically showing a portion of a seat back at which a vehicle seat structure according to a seventh exemplary embodiment is employed.

Below, a seat back of a vehicle seat in which a vehicle seat structure according to a seventh exemplary embodiment is employed is described using FIG. 13. In the seventh exemplary embodiment, structures that are the same as in the third exemplary embodiment shown in FIG. 9 are assigned the same reference symbols and are not described here. Only points that are different are described in detail.

—Seat Back Structure—

In a seat back 12F of a vehicle seat 10F according to the seventh exemplary embodiment, a structure in which the second rear face member 80 is stitched together with the stitched portion 36 differs from the third exemplary embodiment. The another end portion 84 of the second rear face member 80 is at the side thereof at which the stitched portion 36 is disposed, at which the first trim cover 32 and second trim cover 34 are stitched. As shown in FIG. 13, in the seat back 12F of the vehicle seat 10F according to the seventh exemplary embodiment, the another end portion 84 of the second rear face member 80 is stitched to the inner side of the first trim cover 32.

—Seat Back Fabrication Method—

The one end portion 82 of the second rear face member 80 and the extension portion 74 of the first rear face member 70 are fixed to the frame member 14, after which the pad member having the integrated rear face member 20A that is fixed to the frame member 14 is covered by the trim cover 30 serving as the cover skin. At this time, the another end portion 84 of the second rear face member 80 is stitched to the inner side of the first trim cover 32 together with the stitched portion 36 at which the first trim cover 32 and second trim cover 34 are stitched. In this way, the seat back 12F is fabricated.

—Operation and Effects—

Now, operational effects of the seat back 12F of the vehicle seat 10F at which the vehicle seat structure according to the seventh exemplary embodiment is employed are described.

In the structure of the seat back 12F and the fabrication method of the vehicle seat 10F according to the seventh exemplary embodiment, the second rear face member 80 is disposed between the extension portion 74 and the second trim cover 34, the one end portion 82 of the second rear face member 80 is fixed to the frame member 14 together with the extension portion 74, and the another end portion 84 of the second rear face member 80 is stitched to the inner side of the first trim cover 32 together with the stitched portion 36 at which the first trim cover 32 and second trim cover 34 are stitched.

Therefore, the first trim cover 32 and second trim cover 34 are fixed at the frame member 14 by the second rear face member 80. Thus, because the front face side of the pad member 22 is covered by the first trim cover 32 that is fixed at the frame member 14, the pad member 22 is fixed at the frame member 14 by the first trim cover 32. Accordingly, the pad member 22 is fixed at the frame member 14 by the first rear face member 70 and by the second rear face member 80 and first trim cover 32, and mispositioning of the pad member 22 may be doubly prevented.

The another end portion 84 of the second rear face member 80 is stitched together with the stitched portion 36. The another end portion 84 of the second rear face member 80 is stitched to the inner side of the first trim cover 32 at the stitched portion 36. Therefore, the stitched portion 36 may be inclined to the side thereof at which the frame member 14 is disposed to enable assembly of the second trim cover 34. Moreover, sinking of the stitched portion 36 of the first trim cover 32 to the inner side may be suppressed by the another end portion 84 of the second rear face member 80, and the external appearance may be excellently finished.

Supplementary Descriptions of the Exemplary Embodiments

In the exemplary embodiments described above, embodiments are described in which the vehicle seat structure, pad member molding method and vehicle seat fabrication method according to the present disclosure are applied to a seat back. However, the present disclosure is not limited thus and is also applicable to a seat cushion of the vehicle seat 10. Further, the present disclosure is not limited to the vehicle seat 10 and is also applicable to a seat in a building, which is not shown in the drawings.

In the exemplary embodiments described above, when the extension portion 44, 74 or 94 is being fixed to the frame member 14, the clip 50 that serves as the fixing member is employed, but the present disclosure is not limited thus. Provided the extension portion 44, 74 or 94 can be fixed to the frame member 14, a publicly known fixing method may be employed without particular limitation.

In the exemplary embodiments described above, the first rear face member 40, 70 or 90 is formed of a felt, but the present disclosure is not limited thus. For example, the first rear face member may be formed of a wadding material and, beside a woven fabric, felt or the like, may be constituted with a nonwoven fabric or the like.

In the exemplary embodiments described above, the second rear face member 80 is formed of a carpet, but the present disclosure is not limited thus. For example, the second rear face member may be formed of a textile other than a carpet.

Examples of embodiments of the present disclosure are described above, but embodiments of the present disclosure are not limited by the above descriptions. The exemplary embodiments and respective variant examples may be used in suitable combinations, and it will be clear that various modes may be embodied within a technical scope not departing from the gist of the present disclosure.

What is claimed is:

1. A vehicle seat structure, comprising:
a frame member that forms a framework of the vehicle seat;
a pad member that is formed of a foam material and is disposed at a front face side of the frame member; and
a first rear face member that is integrated with the pad member at a rear face side of the pad member, the first rear face member including:
a main body portion that is fixed to the pad member, and
an extension portion that extends from the pad member and is fixed to the frame member,
wherein the main body portion and the extension portion are structured by separate members.

2. The vehicle seat structure according to claim 1, further comprising:
a cover skin that covers the pad member in a state in which the frame member, the first rear face member and the pad member are accommodated inside the cover skin, the cover skin including:
a first cover skin that covers a side at which a front face of the pad member is disposed, and
a second cover skin that covers a side at which the first rear face member integrated with the pad member is disposed;
a stitched portion at which the first cover skin and the second cover skin are stitched together; and
a second rear face member that is disposed between the extension portion and the second cover skin, one end of the second rear face member being fixed to the frame member together with the extension portion, and another end of the second rear face member being stitched at the stitched portion.

3. A vehicle seat structure comprising: according to claim 1,
a frame member that forms a framework of the vehicle seat;
a pad member that is formed of a foam material and is disposed at a front face side of the frame member; and
a first rear face member that is integrated with the pad member at a rear face side of the pad member, the first rear face member including:
a main body portion that is fixed to the pad member, and
an extension portion that extends from the pad member and is fixed to the frame member,
wherein the first rear face member includes a folded portion between the main body portion and the extension portion, the rear face member being arranged in two layers at the folded portion, and
wherein an end portion of the folded portion is disposed at a position set apart from a corner portion of a back face side of the pad member.

4. The vehicle seat structure according to claim 3, wherein the extension portion extends from the main body portion that is integrally fixed to the pad member, and
wherein the extension portion is folded back and fixed to a side of the frame member at which a rear face thereof is formed.

5. The vehicle seat structure according to claim 3, wherein the frame member and the extension portion include insertion holes at respective corresponding positions, and a fixing member is disposed in the insertion holes.

6. The vehicle seat structure according to claim 1, wherein the extension portion extends from the main body portion that is integrally fixed to the pad member, and
wherein the extension portion is folded back and fixed to a side of the frame member at which a rear face thereof is formed.

7. The vehicle seat structure according to claim 1, wherein the frame member and the extension portion include insertion holes at respective corresponding positions, and a fixing member is inserted through the insertion holes.

8. A vehicle seat fabrication method, comprising:
molding a pad member having an integrated rear face member, the molding including integrating a main body portion, which is a portion of a first rear face member, with a pad member that is formed of a foam material;
disposing the main body portion of the pad member having the integrated rear face member at a front face side of a frame member that forms a framework of the vehicle seat;
fixing the pad member having the integrated rear face member to the frame member, the fixing including fixing an extension portion of the first rear face member to the frame member, the extension portion extending from the main body portion; and covering, with a cover skin, the pad member having the integrated rear face member that has been fixed to the frame member.

9. The vehicle seat fabrication method according to claim 8, the cover skin including:
a first cover skin that covers a side at which a front face of the pad member having the integrated rear face member is disposed; and
a second cover skin that covers a side at which the first rear face member that is integrated with the pad member having the integrated rear face member is disposed, the method further including:
disposing a second rear face member between the extension portion and the second cover skin;
fixing one end of the second rear face member to the frame member together with the extension portion; and
stitching another end of the second rear face member to a stitched portion at which the first cover skin and the second cover skin are stitched together.

* * * * *

UNITED STATES PATENT AND TRADEMARK OFFICE
CERTIFICATE OF CORRECTION

PATENT NO. : 12,012,023 B2
APPLICATION NO. : 17/658980
DATED : June 18, 2024
INVENTOR(S) : Toshiki Hirasawa It is certified that error appears in the above-identified patent and that said Letters Patent is hereby corrected as shown below:

In the Specification

Column 1, Line 32, delete "hack" and insert -- back --.

Column 4, Line 36, delete "1w" and insert -- by --.

Column 7, Line 49, delete "Which" and insert -- which --.

Column 8, Line 16 (approx.), delete "22.A" and insert -- 22A --.

Column 10, Line 34, delete "Which" and insert -- which --.

Column 10, Line 61, delete "14" and insert -- 14; --.

Column 11, Line 31 (approx.), delete "5," and insert -- S, --.

Column 13, Line 44, delete "7414" and insert -- 74H --.

Column 15, Line 56, delete "here," and insert -- here. --.

Column 16, Line 51, delete "(hack" and insert -- (back --.

Column 17, Line 56, delete "12F" and insert -- 12E --.

In the Claims

Column 20, Line 14-15, Claim 3, delete "comprising: according to claim 1," and insert -- comprising: --.

Signed and Sealed this
Twenty-sixth Day of November, 2024

Katherine Kelly Vidal
*Director of the United States Patent and Trademark Office*